(12) United States Patent
Jung et al.

(10) Patent No.: US 10,770,768 B2
(45) Date of Patent: Sep. 8, 2020

(54) METAL-AIR BATTERY AND METHOD OF MANUFACTURING THE SAME

(71) Applicant: Samsung Electronics Co., Ltd., Suwon-si, Gyeonggi-do (KR)

(72) Inventors: Insun Jung, Hwaseong-si (KR); Hyukjae Kwon, Suwon-si (KR); Mokwon Kim, Daejeon (KR); Junghwa Kim, Yongin-si (KR); Sunjung Byun, Seongnam-si (KR); Daeun Yu, Suwon-si (KR); Dongjin Yun, Pohang-si (KR); Hyangsook Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 225 days.

(21) Appl. No.: 15/354,539

(22) Filed: Nov. 17, 2016

(65) Prior Publication Data
US 2017/0279173 A1    Sep. 28, 2017

(30) Foreign Application Priority Data
Mar. 25, 2016    (KR) .................. 10-2016-0036122

(51) Int. Cl.
*H01M 12/08* (2006.01)
*H01M 12/06* (2006.01)
*H01M 4/88* (2006.01)
*H01M 4/86* (2006.01)
*H01M 4/96* (2006.01)

(52) U.S. Cl.
CPC .......... *H01M 12/08* (2013.01); *H01M 4/8605* (2013.01); *H01M 4/8807* (2013.01); *H01M 4/8875* (2013.01); *H01M 4/96* (2013.01); *H01M 12/06* (2013.01); *H01M 4/8882* (2013.01); *H01M 2004/8689* (2013.01); *Y02E 60/128* (2013.01)

(58) Field of Classification Search
CPC ...... H01M 12/06; H01M 12/08; H01M 4/865; H01M 4/8605
See application file for complete search history.

(56) References Cited

U.S. PATENT DOCUMENTS

| | | |
|---|---|---|
| 2014/0287908 A1 | 9/2014 | Lee et al. |
| 2014/0313636 A1 | 10/2014 | Tour et al. |

(Continued)

FOREIGN PATENT DOCUMENTS

| | | |
|---|---|---|
| CN | 103482611 A | 1/2014 |
| CN | 104009205 A | 8/2014 |

(Continued)

OTHER PUBLICATIONS

European Search Report for European Patent Application No. 17157073.2 dated May 8, 2017.

(Continued)

*Primary Examiner* — James Lee
(74) *Attorney, Agent, or Firm* — Cantor Colburn LLP

(57) ABSTRACT

A metal-air battery includes an anode portion including a metal; a cathode portion including a porous layer, wherein the porous layer includes a reduced non-stacked graphene oxide; and an electrolyte disposed between the anode portion and the cathode portion.

28 Claims, 28 Drawing Sheets

(56) References Cited

U.S. PATENT DOCUMENTS

2015/0103469 A1  4/2015  Lee et al.
2018/0183122 A1* 6/2018  Grey .................... H01M 4/382

FOREIGN PATENT DOCUMENTS

KR       10-1463722 B1    11/2014
KR    1020150044359 A     4/2015

OTHER PUBLICATIONS

Storm et al.,"Reduced graphene oxide for Li-air batteries: The effect of oxidation time and reduction conditions for graphene oxide", Carbon, vol. 85, 2015, 233-244.

Xiao et al., "Hierarchically Porous Graphene as a Lithium-Air Battery Electrode", Nano Letters, 11, 2011, 5071-5078.

Yoon et al., "Anti-Solvent Derived Non-Stacked Reduced Graphene Oxide for High Performance Supercapacitors", Advanced Materials, 25, 2013, pp. 4437-4444.

Anton Melnyk et al., "Macroscopic Structural Compositions of ‖-Conjugated Polymers: Combined Insights from Solid-State NMR and Molecular Dynamics Simulations," The Journal of Physical Chemistry Letters, Aug. 15, 2017, pp. 4155-4160, vol. 8, No. 17.

Haiqum Chen et al., "Mechanically Strong, Electrically Conductive, and Biocompatible Graphene Paper," Advanced Materials, Sep. 5, 2018, pp. 3557-3561, vol. 20.

* cited by examiner

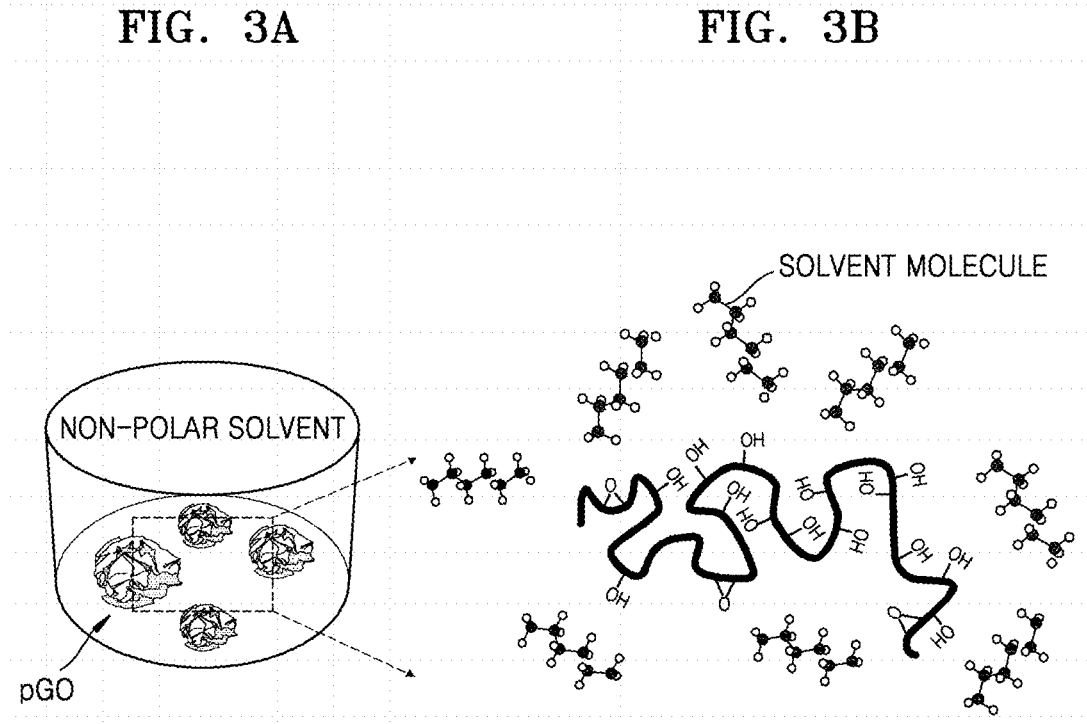

METAL-AIR BATTERY AND METHOD OF MANUFACTURING THE SAME

CROSS-REFERENCE TO RELATED APPLICATION

This application claims the benefit of and priority to Korean Patent Application No. 10-2016-0036122, filed on Mar. 25, 2016, in the Korean Intellectual Property Office, and all benefits accruing therefrom under 35 U.S.C. § 119, the content of which is incorporated herein in its entirety by reference.

BACKGROUND

1. Field

The present disclosure relates to batteries and methods of manufacturing the same, and more particularly, to metal-air batteries and methods of manufacturing the same.

2. Description of the Related Art

A metal-air battery includes an anode that can occlude and emit ions and a cathode that uses oxygen in the air as an active material. The reduction and oxidation of oxygen supplied from the outside occurs at the cathode, whereas oxidation and reduction of a metal occurs at the anode. The chemical energy generated in the metal-air battery is converted into electrical energy and extracted. For example, the metal-air battery absorbs oxygen during a discharge cycle and discharges oxygen during a charge cycle. As such, since the metal-air battery utilizes oxygen in the air as an active material, the cathode active material is not depleted over the course of multiple charge cycles and the energy density of the metal-air battery may be improved. For example, the metal-air battery may have an energy density that is several times greater than that of a lithium-ion battery that does not use oxygen as an active material.

The capacity of a metal-air battery may be primarily determined by a material and configuration of a cathode (e.g., the air electrode). In this regard, there is a demand for the development of a cathode material having physical properties that are advantageous to improve the capacity of a metal-air battery. Furthermore, various aspects of the cathode material, such as improvement of mechanical properties, weight reduction, lower-cost, and ease of production, would be desirable.

SUMMARY

Provided is a metal-air battery having an improved capacity and energy density, and methods of manufacturing the same.

Provided is a metal-air battery having superior charge/discharge properties, and methods of manufacturing the same.

Provided is a metal-air battery, of which weight reduction and miniaturization may be easily achieved, and methods of manufacturing the same.

Provided is a metal-air battery that is advantageous in terms of the ease of manufacturing and reduced manufacturing cost, and methods of manufacturing the same.

Additional aspects will be set forth in part in the description which follows and, in part, will be apparent from the description, or may be learned by practice of the presented embodiments.

According to an aspect of an embodiment, a metal-air battery includes: an anode portion including a metal; a cathode portion including a porous layer, wherein the porous layer includes a reduced graphene oxide, and wherein the reduced graphene oxide is derived from a graphene oxide having a ratio of C—O bonds to C═C bonds of about 0.5 or less; and an electrolyte disposed between the anode portion and the cathode portion.

The ratio (C—O/C═C) of C—O bonds to C═C bonds of the graphene oxide (GO) may range from about 0.1 to about 0.5, and the graphene oxide (GO) may be formed by using an anti-solvent precipitation method and may have a porous structure.

The porous layer may include reduced graphene oxide (rGO) layers which are wave shaped, and an air gap may be formed between the rGO layers without an intermediate material.

An interval between the rGO layers may range from about 1 nanometer (nm) to about 0.15 micrometers ($\mu$m), and the rGO layers may form a porous structure which facilitates a cathode reaction.

The porous layer may be a binder-free material layer.

The porous layer may be a material layer including a binder.

A porosity of the porous layer may range from about 70 volume percent (vol %) to about 95 vol %.

A specific surface area of the porous layer may range from about 100 square meters per gram ($m^2$/g) to about 600 $m^2$/g.

The cathode portion may include a cathode layer and a gas diffusion layer on at least one surface of the cathode layer, and at least one of the cathode layer and the gas diffusion layer may include the porous layer.

A supporting member supporting the gas diffusion layer may include the reduced graphene oxide (rGO) and an additional material, and the additional material may include o a carbon sphere, a carbon rod, a hollow carbon sphere, a hollow carbon rod, an aerogel, a metal oxide sphere, a metal oxide rod, a hollow metal oxide sphere, a hollow metal oxide rod, or a combination thereof.

A thickness of the cathode layer may range from about 1 $\mu$m to about 100 $\mu$m.

A thickness of the gas diffusion layer may range from about 1 micrometer ($\mu$m) to about 30 $\mu$m.

The metal-air battery may have a cathode specific capacity of about 250 milliamperes hours per gram (mAh/g) or greater.

The metal of the anode portion may include lithium and the metal-air battery may be a lithium-air battery.

According to an aspect of another embodiment, a method of manufacturing a metal-air battery includes: providing an anode portion including a metal; forming a cathode portion configured for using oxygen as an active material, wherein the cathode portion comprises a porous layer; and providing an electrolyte between the anode portion and the cathode portion, wherein the forming of the cathode portion includes forming a non-stacked graphene oxide using an anti-solvent precipitation method, reducing the non-stacked graphene oxide to form a reduced non-stacked graphene oxide, and disposing the reduced non-stacked graphene oxide to form the porous layer to manufacture the metal-air battery.

The forming of the non-stacked graphene oxide (GO) using an anti-solvent precipitation method may include dissolving a graphene oxide in a polar solvent, adding a non-polar solvent to the polar solvent to precipitate the non-stacked graphene oxide, and drying the precipitated non-stacked graphene oxide to form the reduced non-stacked graphene oxide.

The forming of the reduced non-stacked graphene oxide (rGO) by reducing the non-stacked graphene oxide (GO) may include performing a thermal treatment on the non-stacked GO in a mixed gas atmosphere of hydrogen and nitrogen to form the reduced non-stacked graphene oxide.

The performing of the thermal treatment may include performing a first thermal treatment on the non-stacked graphene oxide (GO) at a temperature in a range of about 150° C. to about 500° C., and performing a second thermal treatment on the non-stacked GO at a temperature in a range of about 700° C. to about 1200° C. after the first thermal treatment.

The forming of the reduced non-stacked graphene oxide (rGO) by reducing the non-stacked graphene oxide (GO) may include reducing the non-stacked GO using a reducing agent.

The forming of the porous layer to which the non-stacked rGO is applied may include preparing a solution by dispersing the non-stacked rGO in a solvent, and forming a freestanding film including the non-stacked rGO from the solution using a vacuum filtration process.

The preparing of the solution by dispersing the non-stacked rGO in a solvent may include at least one of adding a dispersing agent to the solvent, the dispersing agent dispersing the non-stacked rGO, and performing a sonication process on the solvent containing the non-stacked rGO.

The porous layer may be a binder-free material layer.

The porous layer may be a material layer including a binder.

A ratio (C—O/C═C) of C—O bonds to C═C bonds of the non-stacked graphene oxide (GO) may be about 0.5 or less.

The porous layer may include reduced non-stacked graphene oxide (rGO) layers which are wave shaped, and an air gap may be formed between the non-stacked rGO layers without an intermediate material.

The cathode portion may include a cathode layer and a gas diffusion layer contacting the cathode layer, and at least one of the cathode layer and the gas diffusion layer may include the porous layer.

The anode portion may include lithium as the metal.

BRIEF DESCRIPTION OF THE DRAWINGS

These and/or other aspects will become apparent and more readily appreciated from the following description of the embodiments, taken in conjunction with the accompanying drawings in which:

FIGS. 3A to 3F illustrate a process of drying and reducing the precipitated graphene oxide in a non-polar solvent, as illustrated in FIG. 2D, and a configuration of materials in each step of the process, in which FIGS. 3B, 3D, and 3F are an expanded views of the indicated portions of FIGS. 3A, 3C, and 3E, respectively;

DETAILED DESCRIPTION

Figure 1:
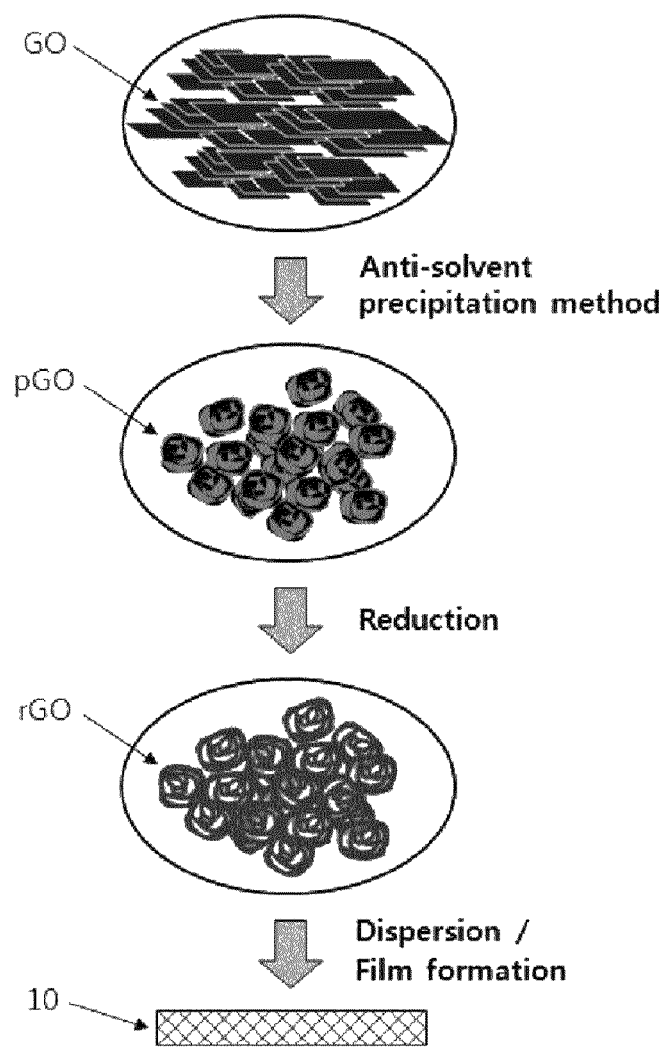
FIG. 1 is a schematic illustration of a method of forming a porous layer that may be included in a cathode portion of a metal-air battery, according to an embodiment.

Various example embodiments will now be described more fully with reference to the accompanying drawings in which example embodiments are shown. Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first", "second", etc. may be used herein to describe various elements, components, regions, layers and/or sections, these elements, components, regions, layers, and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Reference will now be made in detail to metal-air batteries according to embodiments, and a method of manufacturing the metal-air battery, examples of which are illustrated in the accompanying drawings, wherein like reference numerals refer to like elements throughout. The width and thickness of each layer or region illustrated in the drawings may be exaggerated for convenience of explanation and clarity.

FIG. 1 schematically illustrates a method of forming a porous layer that may be applied to a cathode portion of a metal-air battery, according to an embodiment.

Referring to FIG. 1, precipitated graphene oxide (pGO) may be formed from graphene oxide (GO) using an anti-solvent precipitation method. In the process, the shape or structure of the GO may be changed. For example, when the initial GO has a plate or sheet-shaped structure, the pGO may have a crumpled or agglomerate (e.g., aggregated) shape. Also, a material purity of the pGO may be greater than the material purity of the initial GO.

The pGO may be reduced to provide a reduced graphene oxide (rGO). The rGO may denote a material obtained by removing oxygen (O) and a hydroxyl group (—OH radical), which are bonded to carbon (C), from the graphene oxide. Accordingly, a material configuration of the rGO may be the same as or similar to that of graphene. The rGO, like the pGO, may have a crumpled or conglomerated (e.g., agglomerated) shape. In other words, the shape of the pGO may be maintained, substantially or at least partially, after reduction.

A porous, free-standing film 10 may be formed from the rGO. In the following description, the free-standing film 10 is referred to as the porous layer. A dispersion is prepared by dispersing the rGO in a solvent and then the porous layer 10 may be formed from the dispersion using, for example, a vacuum filtration process (e.g., a thin film formation process or another suitable process). The porous layer 10 may include the rGO. The reduced graphene oxide rGO may comprise a plurality of reduced graphene oxide rGO layers. The porous layer 10 may be a binder-free material layer (e.g., not include a binder, or consist of the rGO). In some embodiments, a porous layer including a binder may be formed by mixing the rGO and the binder. In an embodiment, the binder may include any suitable polymer and/or an organic material.

As shown in FIG. 1, the pGO has a non-flat, modulated, crumpled, or conglomerated (e.g., agglomerated) shape comprising plurality of bends and/or creases, and the rGO may have a non-flat, modulated, crumpled or conglomerated (e.g., agglomerated) shape comprising a plurality of bends and/or creases, and the porous layer 10 may be easily manufactured using the same. The porous graphene oxide is obtained by removing, e.g., drying, the solvent from the pGO. The porous graphene oxide may have a porous structure having an expanded interval, or distance, between the layers. In the porous graphene oxide, a ratio (C—O/C=C) of C—O bonds (e.g., $sp^3$ hybridized bonds) to C=C bonds (e.g., $sp^2$ hybridized bonds) may be about 0.5 or less. For example, in the porous graphene oxide, a ratio (C—O/C=C) of C—O bonds to C=C bonds may be about 0.01 to about 0.5, about 0.05 to about 0.4, or about 0.1 to about 0.3, such as about 0.1 to about 0.5. This may be compared to a untreated graphene oxide in which a ratio (C—O/C=C) of C—O bonds to C=C bonds is greater than 0.6. The porous graphene oxide used may have a C—O/C=C bonding ratio of about 0.5 or less, unlike the untreated graphene oxide, and the rGO reduced from the porous graphene oxide may have a porous structure having an expanded interval between the layers. The porous layer 10 including the rGO may exhibit properties suitable for a cathode portion material of a metal-air battery. The above-described C—O/C=C bonding ratio is described later in detail with reference to FIG. 15.

The porous layer 10 formed in the method described in FIG. 1 may have desirable properties in various aspects, such as a high specific surface area, a high electric conductivity, a relatively high or appropriate porosity, a superior mechanical strength, and a low weight. The structure (fine structure) and properties of the porous layer 10 are described in further detail with reference to FIG. 5.

The process of FIG. 1 is described in detail with reference to FIGS. 2A to 2D, FIGS. 3A to 3F, and FIGS. 4A to 4D. The detailed processes illustrated in FIGS. 2A to 2D, FIGS. 3A to 3F, and FIGS. 4A to 4D are exemplary, and the processes may be changed in any suitable way.

FIGS. 2A to 2D illustrate a method of forming the pGO using the anti-solvent precipitation method shown in FIG. 1.

Figure 2A:
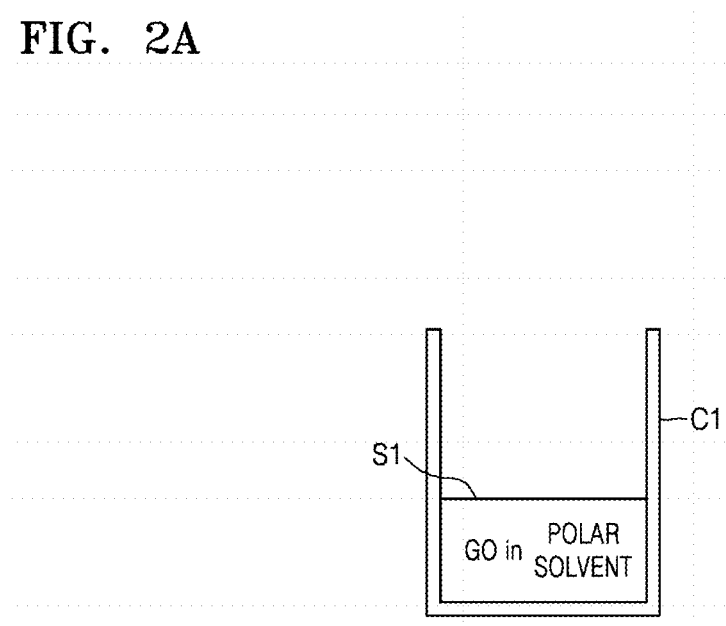
FIGS. 2A to 2D illustrate a method of forming precipitated graphene oxide by using an anti-solvent precipitation method as depicted in FIG. 1.

Referring to FIG. 2A, a graphene oxide (GO) may be dissolved in a polar solvent in a container C1. The GO may be in the form of a powder, and as the GO is dissolved in the polar solvent, a graphene oxide solution S1 in which the GO is dissolved may be obtained. The polar solvent may be, for example, ethanol. For example, graphene oxide powder of about 330 milligrams (mg) is contacted with about 1 liter (L) of ethanol, is allowed to dissolve and disperse, thereby forming the graphene oxide solution S1. The type of the polar solvent is not limited to ethanol and any suitable polar solvent may be used therefor. The polar solvent may include polar protic solvents or polar aprotic solvents, and the polar solvent may include alcohols or alcohol-based solvents, for example.

Figure 2B:
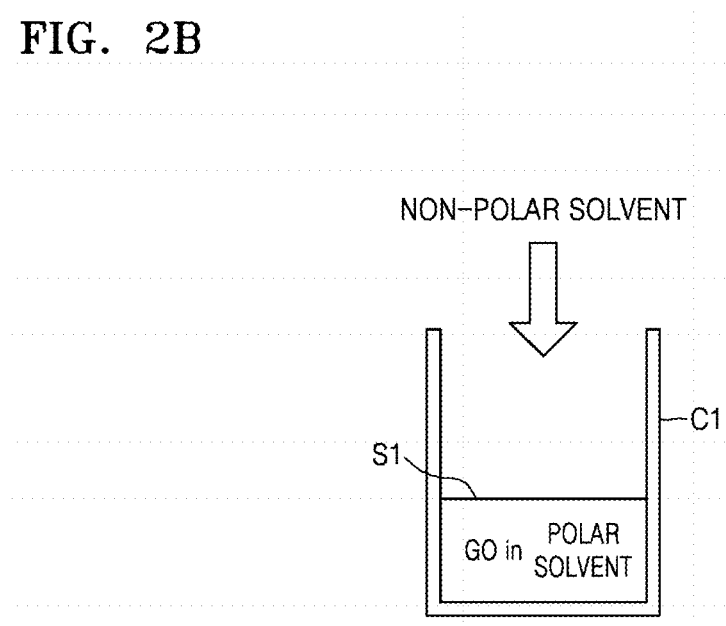

Referring to FIG. 2B, a non-polar solvent may be added (e.g., injected) into the graphene oxide solution S1. The non-polar solvent may include any suitable solvent including, for example, hexane, pentane, heptanes, or a combination thereof. For example, the non-polar solvent may be hexane.

Figure 2C:
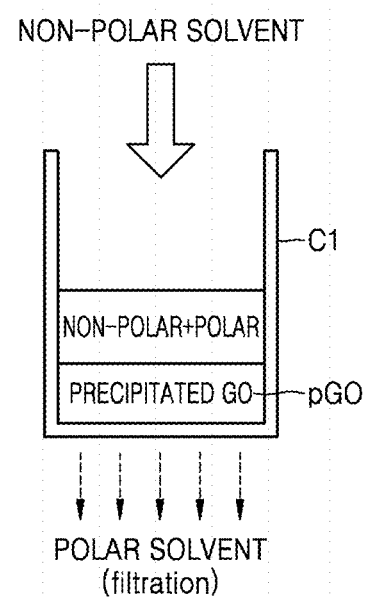

When the non-polar solvent is added to the graphene oxide solution S1, the GO dissolved in the polar solvent may be crystallized and precipitated to provide precipitated graphene oxide (pGO). Accordingly, as illustrated in FIG. 2C, precipitated graphene oxide (pGO) may be formed. The polar solvent may be removed in a filtration method by continuously adding the non-polar solvent to the graphene oxide solution S1. The polar solvent may be completely or almost completely removed by the filtration method. As a result, as illustrated in FIG. 2D, the pGO precipitated in the non-polar solvent may be obtained.

In FIGS. 2A to 2D, since the GO dissolved in the polar solvent is crystallized and precipitated using the non-polar solvent, this method may be referred to as an anti-solvent precipitation method. The pGO, formed by the above method, may have a crumpled or conglomerated (e.g., agglomerated) shape, not a plate or a sheet shape. Accordingly, a porous layer suitable for use as a material of a cathode portion of a metal-air battery may be formed using the pGO. In addition, the pGO formed by the anti-solvent precipitation method may have a material purity that is greater than a material purity of the initial GO. Without being bound by theory, the impurities may be removed when forming the precipitated graphene oxide during the recrystallization step.

Figure 2D:
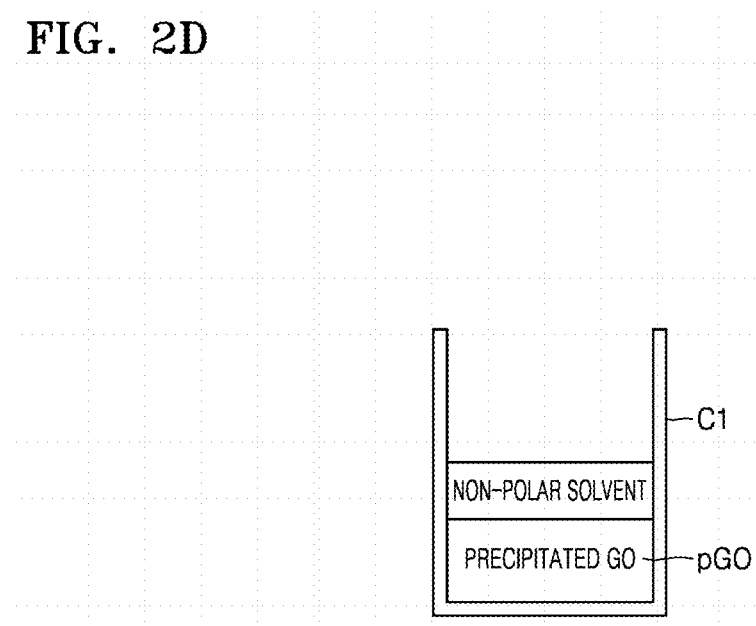

FIGS. 3A to 3F illustrate a process of drying and reducing the pGO in the non-polar solvent of FIG. 2D, and a configuration of the materials in each step of the process.

FIGS. 3A and 3B illustrate a structure of an embodiment of the pGO in a non-polar solvent. The pGO of FIG. 3A may correspond to the pGO of FIG. 2D. As illustrated in FIG. 3A, the pGO may have a meanderingly crumpled or conglomerated (e.g., agglomerated) shape. Without being bound by theory, this is understood to be due to the effects of the non-polar solvent used in the anti-solvent precipitation method. In other words, when the GO is crystallized or precipitated as the non-polar solvent is input in the operations of FIGS. 2B and 2C, the crystallized GO may be conglomerated or crumpled because a part of the GO is not dissolved by the non-polar solvent. In this state, although hexane ($C_6H_{14}$) is mentioned as the non-polar solvent, any suitable non-polar solvent may be used.

Figures 3C, 3D:
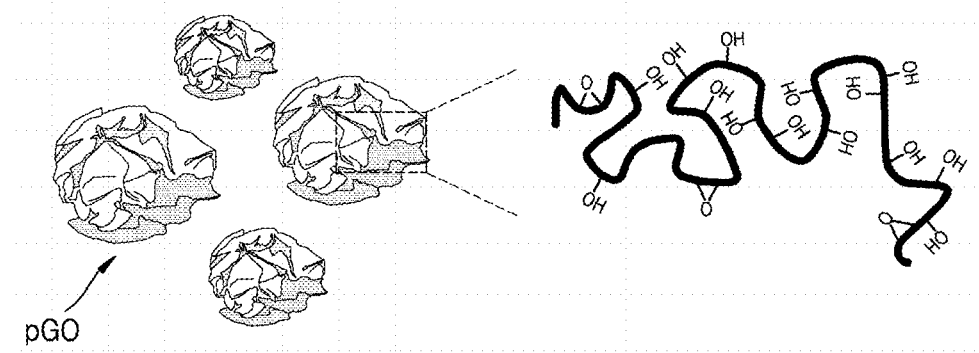

FIGS. 3C and 3D illustrate a result obtained by removing the non-polar solvent from the pGO of FIG. 3A in a drying process. The drying process may be performed, for example, at a temperature of about 100° C. or less in an oven. The pGO may have a porous structure in which the interval between layers is greater than an interval between layers of the GO. In this regard, in the graphene oxide (pGO), a ratio (C—O/C=C) of C—O bonds (e.g., $sp^3$ hybridized bonds) to C=C bonds (e.g., $sp^2$ hybridized bonds) may be about 0.5 or less. In an exemplary embodiment, the ratio (C—O/C=C) may be about 0.1 to about 0.5.

Figures 3E, 3F:
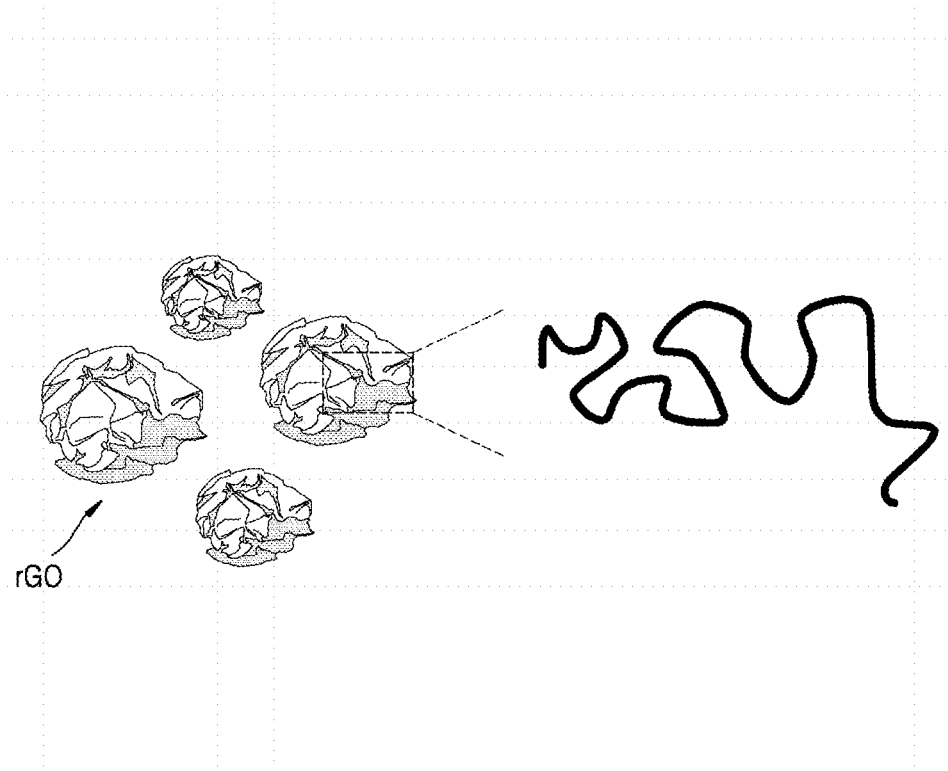

FIGS. 3E and 3F illustrate the results obtained by reducing the pGO of FIGS. 3C and 3D. Oxygen O and hydroxyl groups (—OH radical) bonded to carbon (C) may be removed from the pGO through a suitable reduction process, and thus, a reduced graphene oxide (rGO) may be obtained.

The process of forming the rGO by reducing the pGO may include, for example, performing a thermal treatment on the pGO in an atmosphere of a mixed gas of hydrogen and nitrogen. The thermal treatment process may include performing a first thermal treatment on the pGO at a temperature of about 150° C. to about 500° C., and performing a second thermal treatment on the pGO at a temperature of about 700° C. to about 1200° C. In an exemplary embodiment, the first thermal treatment may be performed at a temperature of about 300° C. for a time of about several minutes or more, and the second thermal treatment may be performed at a temperature of about 1000° C. for a time of about one hour. The pGO may be partially reduced by the first thermal treatment. The partially reduced GO may be completely or almost completely reduced by the second thermal treatment. Water molecules adsorbed by the GO or remaining solvent may be completely or almost completely removed by the second thermal treatment process. In an exemplary embodiment, the reduction of the pGO of FIG. 3C may be performed using a suitable reducing agent instead of the above-described thermal treatment process. In an exemplary embodiment, both the reduction using a reducing agent and the reduction through a thermal treatment may be used.

The graphene oxide (pGO) of FIGS. 3C and 3D may be referred to as a non-stacked type graphene oxide, that is, an NS-GO. Unlike a graphene or graphene oxide that has a plate or sheet shape and is stacked on one another, the pGO of FIG. 3C has a crumpled or conglomerated shape and thus the term of "non-stacked type" may be used to refer to this embodiment. Also, similarly, the rGO of FIG. 3E may be referred to as the non-stacked type of rGO, that is, an NS-rGO. The rGO may be a porous material.

Although in FIGS. 3A to 3F the particles of the pGO and the rGO are illustrated to have a round particle shape (e.g., a conglomerated shape), this is merely exemplary and the shape of the pGO and the rGO may be changed in any suitable shape. This applies to the pGO and the rGO of FIG. 1 in a similar way. The rGOs of FIGS. 1 and 3E may be particles or flakes and may have a nanoscale or a microscale size.

FIGS. 4A to 4D illustrate a method of forming a porous layer 10 using the rGO of FIG. 3C.

Figure 4A:
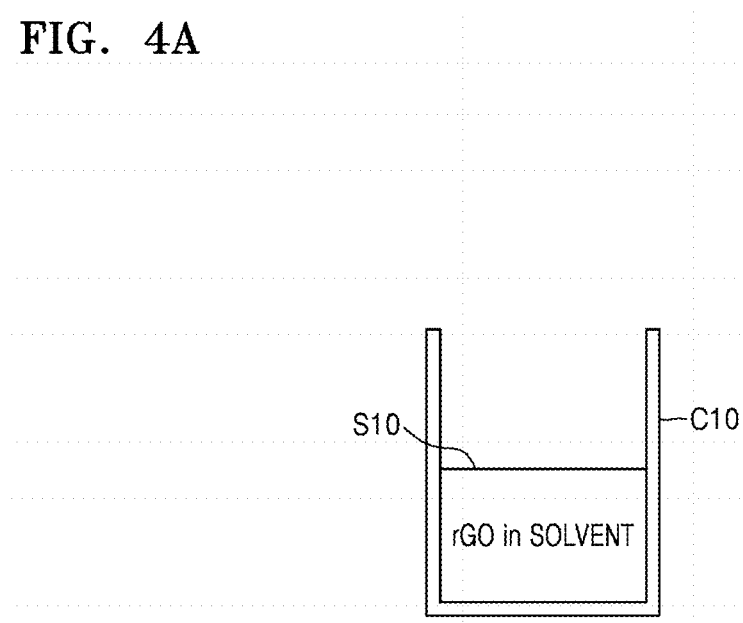
FIGS. 4A to 4D illustrate a method of forming a porous layer using a reduced graphene oxide (rGO) of FIG. 3E.

Referring to FIG. 4A, a solution S10 in which the rGO is dispersed in a solvent is prepared in a container C10. The rGO may be dispersed without being dissolved by the solvent. In order to have the rGO further dispersed in the solvent, a suitable dispersing agent may be added to the solvent or a sonication process may be performed. A polymeric surfactant, including but not limited to polystyrene sulfonate (PSS), polyvinyl pyrrolidone (PVP), cetylpyridinium chloride (CPC), cetyltrimethylammonium bromide (CTAB), cetyltrimethylammonium chloride (CTAC), or a combination thereof, may be used as the dispersing agent. The sonication process may be performed using, for example, a bar type sonicator, for several minutes to several hours. The sonication process may be performed using the dispersing agent. Through this process, the solution S10 in which the rGO is dispersed may be prepared. The solution S10 may be referred to as the graphene dispersed solution. In an exemplary embodiment, 20 milligrams (mg) of the rGO and 0.56 milliliter (mL) of a PSS solution (having a molecular weight of about 75000 Daltons, 18 weight percent (wt %) in water), which is a dispersing agent, are added to 40 mL of deionized water and is sonicated using a bar type sonicator for about one hour, and thus, the solution S10 in which the rGO is dispersed may be manufactured.

Figure 4B:
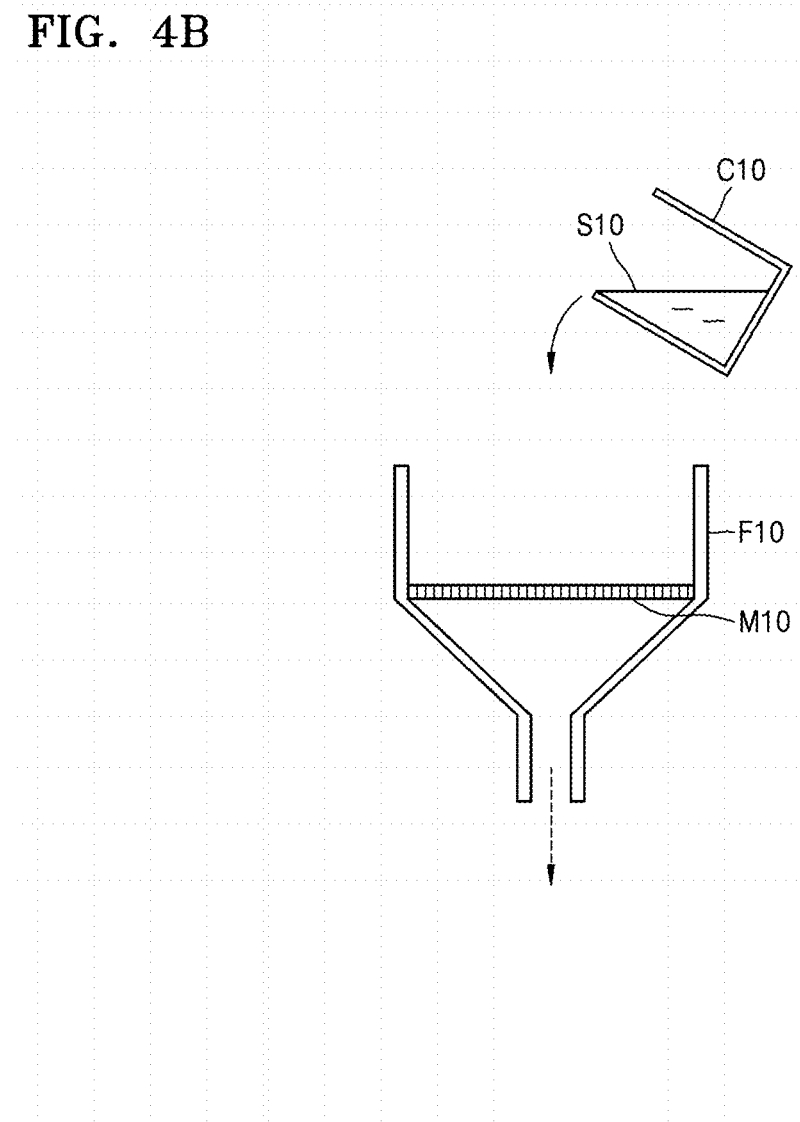
Figure 4C:
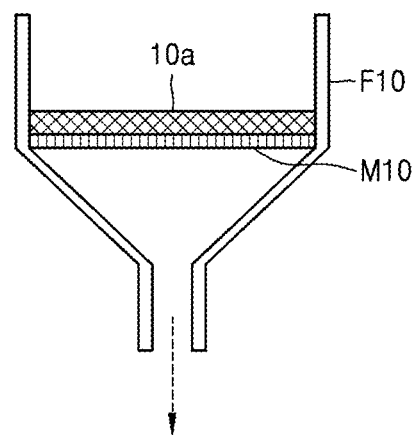

Referring to FIGS. 4B and 4C, a film 10a including the rGO may be formed from the solution S10 using a vacuum filtration process. In further detail, as illustrated in FIG. 4B, the vacuum filtration process is performed using a filter funnel F10 having a membrane filter M10, and, as illustrated in FIG. 4C, the film 10a obtained from the solution S10 may be formed on the membrane filter M10. For example, a polyvinylidene difluoride (PVDF) membrane having a pore size of 0.45 micrometers (μm) and a diameter of 47 millimeters (mm) and being hydrophilic may be used as the membrane filter M10. Although not illustrated, a suitable filter paper may be further provided on the membrane filter M10 to form the filter 10a on the filter paper.

Figure 4D:
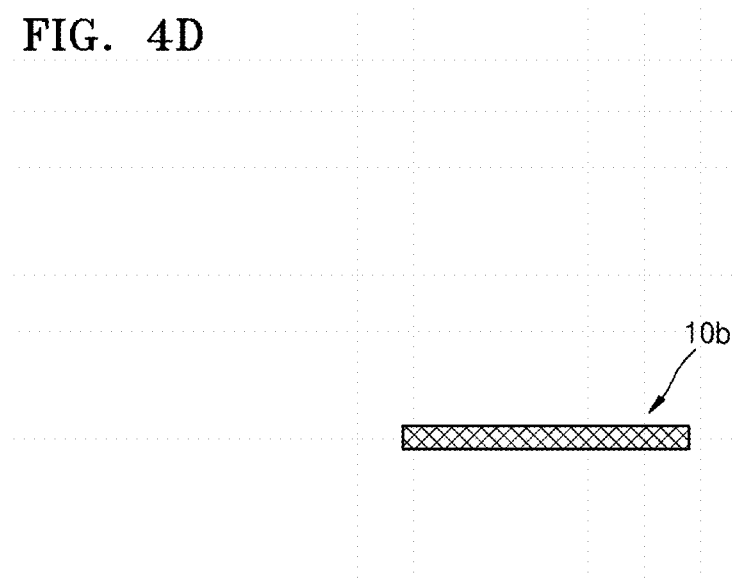

Next, after a drying process, for example, drying the film 10a at room temperature, the film 10a can be separated from the membrane filter M10 and an additional drying process, for example, vacuum drying may be further performed if desired. As a result, as illustrated in FIG. 4D, a free-standing film 10b including the rGO may be obtained. The free-standing film 10b may be a porous layer. The free-standing film 10b may correspond to the porous layer 10 of FIG. 1. The free-standing film 10b may be a binder-free material layer.

Figure 5:
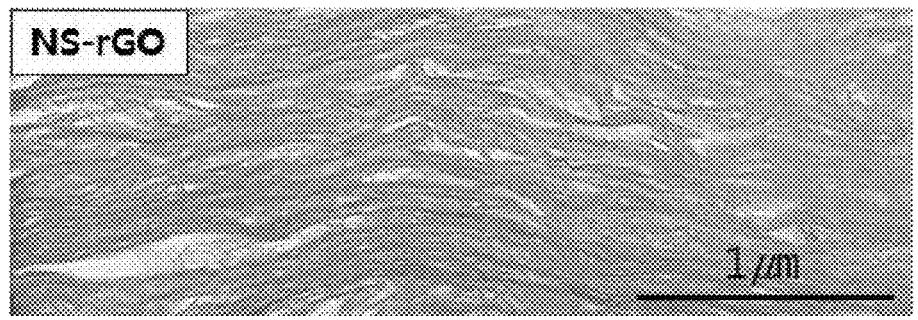
FIG. 5 is a transmission electron microscope (TEM) image of the porous layer formed by a method according to an embodiment.

FIG. 5 is a transmission electron microscope (TEM) image showing a fine structure of a porous layer formed by a method according to an embodiment. The porous layer of FIG. 5 is formed by the method of FIG. 1 and the process thereof is described above with reference to FIGS. 2A to 4D. The porous layer of FIG. 5 may correspond to the free-standing film 10b of FIG. 4D.

Referring to FIG. 5, the porous layer may include rGO layers having a wavy shape, and a gap (e.g., an air gap) may be formed between the rGO layers without an intermediate material (e.g., a spacer). The porosity of the porous layer may be about 70 volume percent (vol %) or more or about 80 vol % or more. For example, the porosity of the porous layer may be about 70 vol % to about 95 vol %, or about 75 vol % to about 99 vol %, or about 80 vol % to about 90 vol %, based on a total volume of the porous layer. The specific surface area of the porous layer may be about 100 square meters per gram ($m^2/g$) or more or about 400 $m^2/g$ or more. For example, the specific surface area of the porous layer may be about 100 $m^2/g$ to about 600 $m^2/g$, about 200 $m^2/g$ to about 500 $m^2/g$, or about 250 $m^2/g$ to about 400 $m^2/g$. In an embodiment, however, the specific surface area of the porous layer may be about 600 $m^2/g$ or more or about 1000 $m^2/g$ or more, about 400 $m^2/g$ to about 2000 $m^2/g$, or about 500 $m^2/g$ to about 1500 $m^2/g$. In the porous layer, an interval between the rGO layers may be, for example, about 1 nanometer (nm) to about 0.15 micrometer (μm), and the rGO layers may form a porous structure to facilitate the redox reactions that occur at the cathode. Also, in the porous layer, a content of the rGO may be about 85 wt % or more or about 90 wt % or more, e.g., about 85 wt % to 100 wt %, about 90 wt % to about 99 wt %, or about 95 wt % to about 98 wt %, based on a total weight of the porous layer. The porous layer may comprise or consist of the rGO and may not include an intermediate material (e.g., a spacer) or a binder. The interval between the rGO layers may be maintained without the intermediate material (e.g., spacer). Also, the porous layer may maintain the layer structure without a binder, and may improve a mechanical strength of the layer structure. Since the porous layer does not include the intermediate material or the binder and has a relatively high porosity, the porous layer can have a very low weight.

When a film is manufactured using a graphene-based material, a stacking phenomenon occurs, which, without being bound by theory, is due to a pi (π)-pi (π) bonding between the graphene-based material layers, thereby forming a dense layer structure. In this case, a size of a reactive surface may be decreased and a void or a pore for storing the redox reaction products may become insufficient. To reduce the stacking phenomenon due to the above-described pi (π) bonding, a hybridization process of inserting an intermediate material (e.g., a spacer) between the graphene-based material layers may be performed. In this case, a complicated synthesis process is used, and a capacity increase effect may not be great. Also, when the intermediate material or the binder is included, it may be difficult to provide a desired level of porosity or specific surface area and as the weight of the layer increases, it may be disadvantageous to implement a low-weight battery.

However, as disclosed herein, a porous layer including the rGO may be manufactured using the anti-solvent precipitation method. In the porous layer, an air gap may be formed and maintained between the rGO layers without an intermediate material, and a superior mechanical strength may be obtained while the layer structure is maintained without a binder. Furthermore, the porous layer may have a low weight. The porous layer may be applied to the cathode portion of a metal-air battery and to provide improved properties such as a reduced weight, improved cathode specific capacity, improved mechanical strength, improved specific surface area, and improved electrical conductivity. Accordingly, when the porous layer is applied to the cathode portion of a metal-air battery, a metal-air battery having improved performance may be obtained. In this regard, the capacity and energy density of a metal-air battery may be increased, and the charge/discharge properties may be improved relative to a metal-air battery that does not include the cathode portion. Also, weight reduction and miniaturization of a metal-air battery may be possible, the manufacturing costs may be reduced, and simplification of a process may be provided.

The porous layer of FIG. 5 may be a layer including a non-stacked type rGO, that is, NS-rGO. In an embodiment, the porous layer may be an NS-rGO layer. Also, the porous layer may have a structure in which the rGO layers are disordered and are not-densely stacked. Accordingly, the porous layer may be a non-densely stacked rGO.

Figure 6:
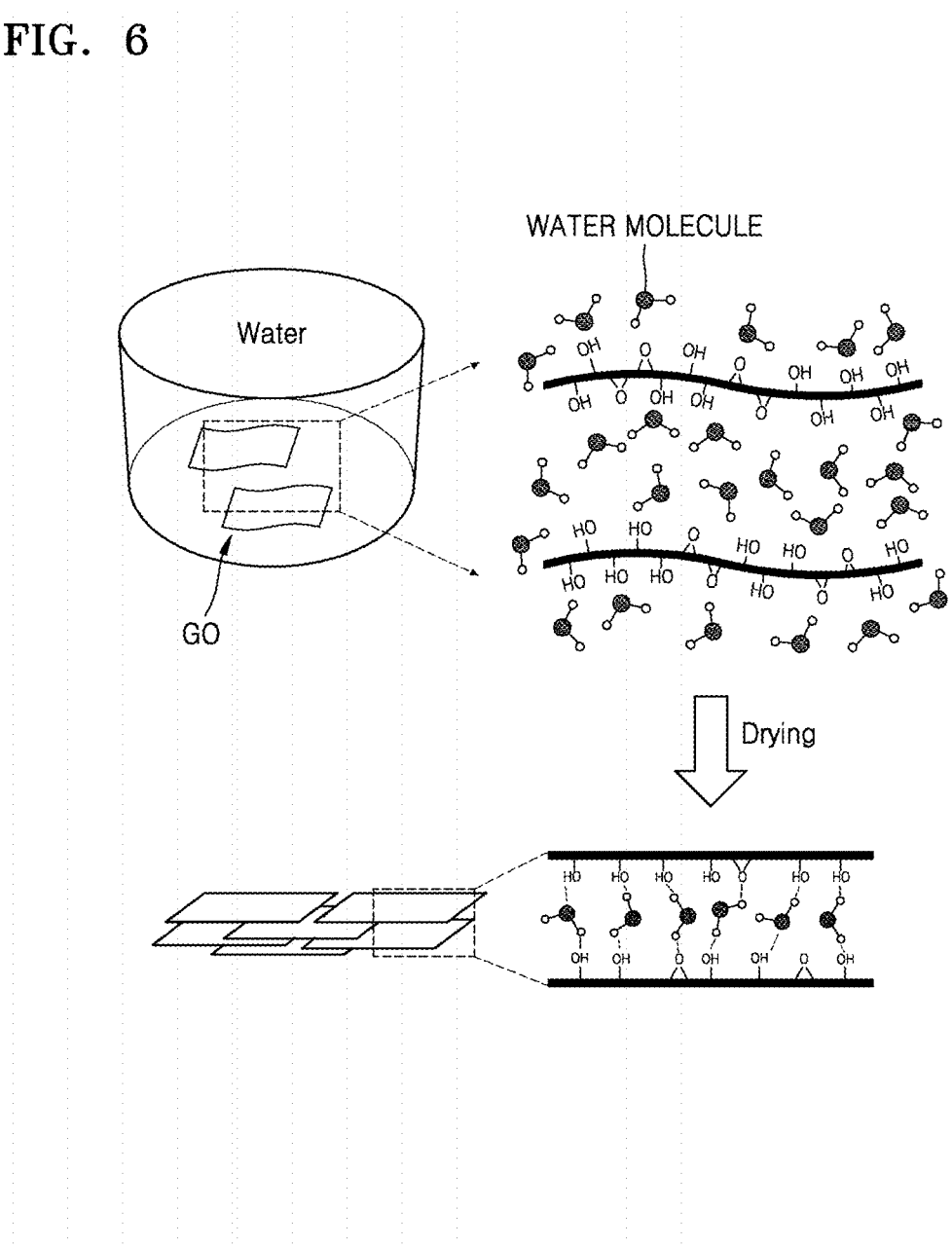
FIG. 6 illustrates a method of forming a graphene oxide film according to an embodiment.

FIG. 6 illustrates a method of forming a graphene oxide film, according to a comparative example.

Referring to FIG. 6, a GO dispersed in water may have a flat shape, and the GO may have a relatively high affinity to water molecules. After drying, a densely-stacked graphene oxide film may be formed. Also, after drying, the water molecules may be adsorbed on the hydrophilic GO. This may be contrasted with the properties of non-polar molecules, for example $C_6H_{14}$ of a non-polar solvent that does not interact with the GO.

Figures 7A, 7B:
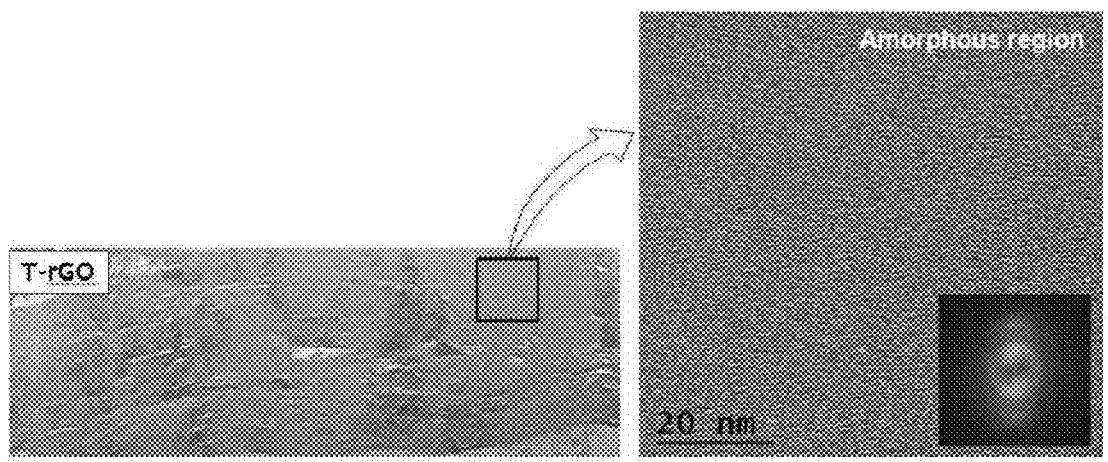
FIG. 7A is a transmission electron microscope (TEM) image of a film including a reduced graphene oxide (rGO), according to a comparative example.
FIG. 7B is an expanded view of the indicated portion of FIG. 7A.

FIGS. 7A and 7B are a TEM images showing a film including a rGO, according to a Comparative Example. The film according to the Comparative Example is manufactured by forming a film from a GO powder without using the anti-solvent precipitation method and then reducing the film through a thermal treatment. The thermal treatment is performed for three hours at a temperature of 800° C. in an atmosphere of a mixed gas of hydrogen and nitrogen (5% $H_2/N_2$ gas). The rGO formed according to the Comparative Example is described herein as a stacked-type thermally reduced graphene oxide (T-rGO) for convenience of explanation.

Referring to FIGS. 7A and 7B, the T-rGO film according to the Comparative Example may have a dense graphite structure. Also, the T-rGO film may have an amorphous region.

To prevent the formation of a dense structure as illustrated in FIG. 7A, a complicated process of inserting an intermediate material (e.g., a spacer) between rGO layers may be used. However, in an embodiment, a porous layer may be prepared using the anti-solvent precipitation method, wherein the stacking phenomenon may be restricted without inserting an intermediate material between the rGO layers. Also, when the method according to the above embodiment is used, water molecules may be easily removed from the GO and reduction of the GO, and surface modification may be performed. In addition, in the thermal treatment process or a subsequent process, the phenomenon that the graphene layers are densely stacked or the shape of a film collapses may be effectively prevented or suppressed. In particular, water molecules inserted between the layers in an oxidized graphene state are not adequately removed in a reduction/thermal treatment process due to the stacking phenomenon that remains after the reduction. Accordingly, the battery properties may be deteriorated and capacity may be decreased. However, according to an embodiment, this problem may be effectively prevented or reduced. Thus, when the disclosed porous layer according to an embodiment is applied to a metal-air battery, performance, capacity, and lifespan of a battery may be enhanced.

In the following description, a metal-air battery comprising a porous layer, that is, a NS-rGO layer, according to an embodiment is described with reference to FIGS. 8 to 10.

Figure 8:
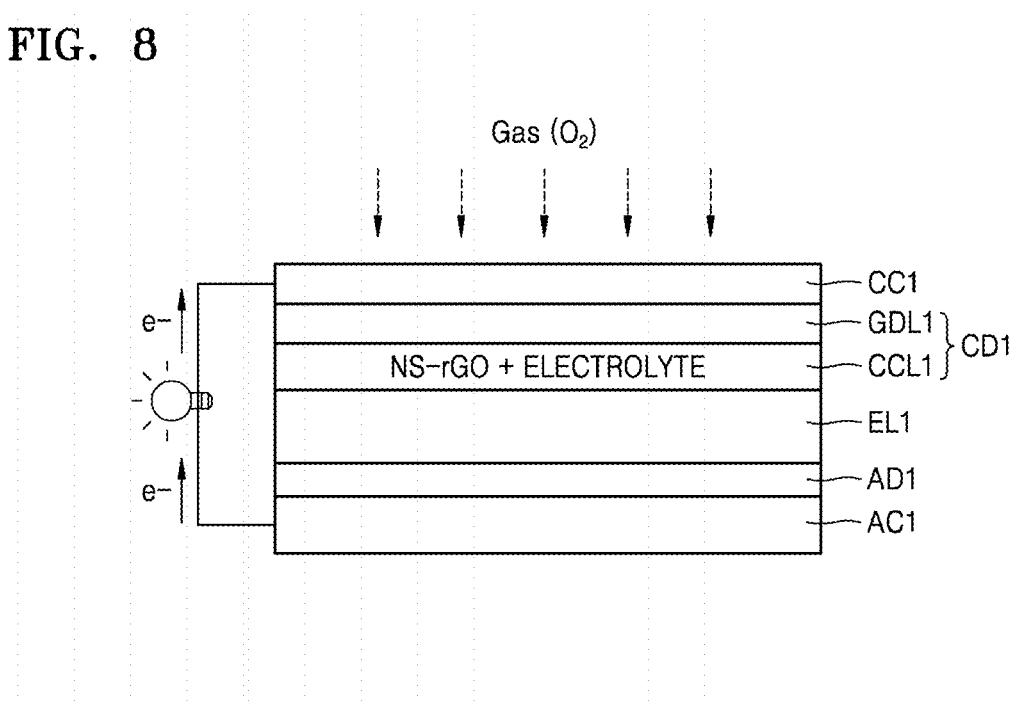
FIG. 8 is a cross-sectional view of a metal-air battery according to an embodiment.

FIG. 8 is a cross-sectional view of a metal-air battery according to an embodiment.

Referring to FIG. 8, the metal-air battery according to an embodiment may include an anode portion AD1, a cathode portion CD1 spaced apart from the anode portion AD1, and an electrolyte layer EL1 provided between the anode portion AD1 and the cathode portion CD1. The anode portion AD1 may include a metal. The cathode portion CD1 uses oxygen $O_2$ in the air as an active material and may include a porous layer, that is, an NS-rGO layer, formed using the anti-solvent precipitation method. In the following description, the material configuration of each of the anode portion AD1, the cathode portion CD1, and the electrolyte layer EL1 is described in further detail.

The anode portion AD1 may include a material capable of occluding and emitting metal ions. The material may include, for example, lithium (Li), sodium (Na), zinc (Zn), potassium (K), calcium (Ca), magnesium (Mg), iron (Fe), aluminum (Al), or an alloy formed of at least two of the materials. For example, the anode portion AD1 may include lithium (Li). In an exemplary embodiment, the anode portion AD1 may include at least one of lithium, a lithium-based alloy, and a lithium intercalation compound. When the anode portion AD1 includes lithium, a metal-air battery according to an embodiment may be referred to as the lithium-air battery.

The cathode portion CD1 may include a cathode layer (hereinafter, referred to as the cathode catalyst layer) CCL1, and may further include a gas diffusion layer GDL1 contacting at least a surface of the cathode catalyst layer CCL1. At least one of the cathode catalyst layer CCL1 and the gas diffusion layer GDL1 may include the porous layer, that is, a porous NS-rGO layer, according to the embodiment. In an embodiment, the cathode catalyst layer CCL1 may include the porous layer, that is, the NS-rGO layer. Also, at least a part of the cathode catalyst layer CCL1 may be impregnated with an electrolyte (e.g., an electrolyte solution). The cathode catalyst layer CCL1 may have a structure in which the porous NS-rGO layer is saturated with the electrolyte. The cathode catalyst layer CCL1 may be referred to as the cathode or cathode layer. The gas diffusion layer GDL1 may facilitate a supply of oxygen $O_2$ to the cathode catalyst layer CCL1. The gas diffusion layer GDL1 may comprise a carbon-based material. For example, the gas diffusion layer GDL1 may be formed of a carbon fiber or a carbon sheet. However, the material of the gas diffusion layer GDL1 is not limited to a carbon fiber or a carbon sheet, and any suitable gas diffusion material may be used. In an exemplary embodiment, the gas diffusion layer GDL1 may not be used. The thickness of the cathode catalyst layer CCL1 may be, for example, about 1 μm to about 100 μm, and the thickness of the gas diffusion layer GDL1 may be, for example, about 1 μm to about 30 μm. However, the above thickness ranges of the layers CCL1 and GDL1 are not limited to the above descriptions and any suitable thickness may be used.

The electrolyte layer EL1 may include an aqueous electrolyte and/or a non-aqueous electrolyte. Also, the electrolyte layer EL1 may include a liquid electrolyte and/or a solid electrolyte. The electrolyte of the electrolyte layer EL1 may be included in a water permeable separator or a matrix layer. In an embodiment, the electrolyte layer EL1 may include a glass fiber separator and an electrolyte contained therein. In addition, any suitable structure of the electrolyte layer EL1 may be used. Any suitable electrolyte that may be used for a metal-air battery may be used for the electrolyte layer EL1.

The metal-air battery according to an embodiment may further include an anode current collector AC1 contacting the anode portion AD1. The anode portion AD1 may be arranged between the anode current collector AC1 and the electrolyte layer EL1. The anode current collector AD1 may include, for example, a stainless steel SUS or other conductive body. The metal-air battery according to an embodiment may further include a cathode current collector CC1 contacting the cathode portion CD1. The cathode portion CD1 may be arranged between the cathode current collector CC1 and the electrolyte layer EL1. The cathode current collector CC1 may include, for example, SUS. In an exemplary embodiment, the SUS of the cathode current collector CC1 may have a mesh structure for transmitting air or gas. The material of the cathode current collector CC1 is not limited to the SUS and any suitable material may be used. The anode current collector AC1 may be considered to be a part of the anode portion AD1, and similarly, the cathode current collector CC1 may be considered to be a part of the cathode portion CD1. In an exemplary embodiment, at least one of the anode current collectors AC1 and the cathode current collector CC1 are not included.

The anode portion AD1 may provide metal ions and oxygen in the air may be provided through the cathode portion CD1. As the metal ions and the oxygen undergo an electrochemical reaction, the battery properties may be realized. For example, during discharge, the metal of the anode portion AD1 releases an electron (oxidation) and becomes a metal ion. The metal ion is moved toward the cathode portion CD1 via the electrolyte layer EL1 and is then bonded by the oxygen, thereby forming a metal oxide. During a charge step, the metal oxide is dissolved in the electrolyte and the oxygen may be emitted through the cathode portion CD1, and the metal ions may be moved toward the anode portion AD1 to be reduced to a metal.

The method of manufacturing a metal-air battery as in FIG. 8 is further described below. A lithium metal layer of about 16 millimeters (mm) may be formed as the anode portion AD1 on the SUS that is the anode current collector AC1. After a glass fiber layer of about 16 mm is formed on the anode portion AD1, the glass fiber layer may be filled with electrolyte. The electrolyte may include, for example, tetra(ethylene glycol) dimethyl ether (TEGDME) and lithium bis(trifluoromethanesulfonyl) imide (LiTFSI) in an amount of 0.5 molar (M). The glass fiber layer including the electrolyte may correspond to the electrolyte layer EL1 of FIG. 8. After the free-standing film, that is, the porous layer or NS-rGO layer, is placed on the electrolyte layer EL1, the porous layer may be sufficiently wet and impregnated with the electrolyte. The porous layer may correspond to the cathode catalyst layer CCL1. Next, a carbon sheet may be formed on the cathode catalyst layer CCL1 with the gas diffusion layer GDL1, a stainless steel (SUS) cathode current collector CC1 may be disposed on the carbon sheet. The cathode current collector CC1 may have a mesh structure. The method of manufacturing a metal-air battery presented herein is merely exemplary and any suitable method of manufacturing the air-metal battery may be used.

Figure 9:
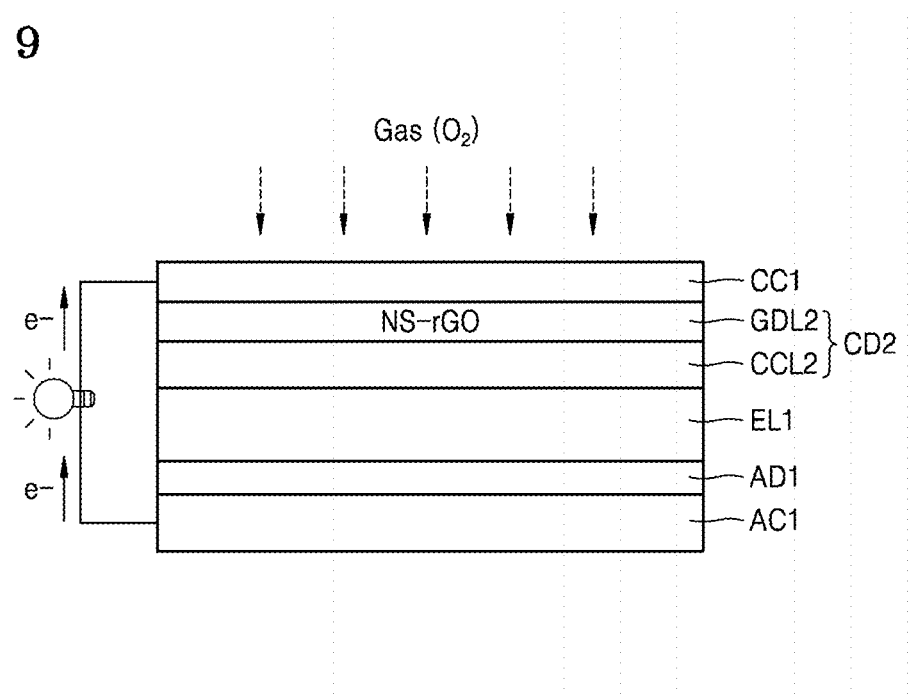
FIG. 9 is a cross-sectional view of a metal-air battery according to an embodiment.

FIG. 9 is a cross-sectional view of a metal-air battery according to another embodiment. In an embodiment, the porous layer, that is, the NS-rGO layer formed using the anti-solvent precipitation method, may be applied to a gas diffusion layer GDL2 of a cathode portion CD2. The gas diffusion layer GDL2 may be the porous layer, that is, the NS-rGO layer, according to an embodiment. A cathode catalyst layer CCL2 may include a carbon-based material. For example, the cathode catalyst layer CCL2 may include a carbon-based material such as carbon nanotubes (CNTs), carbon black, graphene, graphite, carbon fibers, and active carbon. Also, the cathode catalyst layer CCL2 may include a catalyst material to facilitate oxidation and reduction, an aqueous electrolyte or a non-aqueous electrolyte, and a suitable binder. The material of the cathode catalyst layer CCL2 presented herein is merely exemplary and any suitable material may be used.

Figure 10:
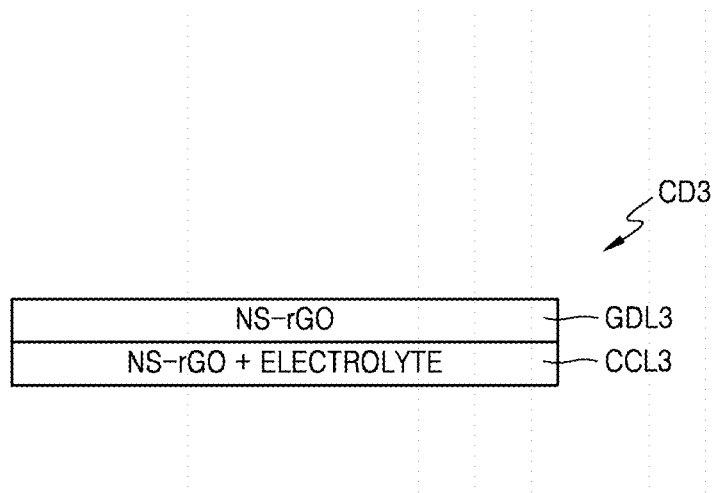
FIG. 10 is a cross-sectional view of a cathode portion of a metal-air battery according to an embodiment.

FIG. 10 is a cross-sectional view of a cathode portion CD3 of a metal-air battery according to another embodiment.

Referring to FIG. 10, the cathode portion CD3 may include a cathode catalyst layer CCL3 and a gas diffusion layer GDL3. The porous layer, that is, the NS-rGO layer, according to the embodiment may be included in both of the cathode catalyst layer CCL3 and the gas diffusion layer GDL3. Accordingly, the cathode catalyst layer CCL3 may have a structure that is the same as or similar to the structure of the cathode catalyst layer CCL1 of FIG. 8, whereas the gas diffusion layer GDL3 may have a structure that is the same as or similar to the structure of the gas diffusion layer GDL2 of FIG. 9. Also, if desired, a portion (e.g., a lower end portion) of the porous layer, that is, the NS-rGO layer, having a single layer structure may be used as the cathode catalyst layer CCL3, and the other portion (e.g., an upper end portion) thereof may be used as the gas diffusion layer GDL3. In this case, an integrated structure wherein the cathode catalyst layer CCL3 participates in the redox reaction and the gas diffusion layer GDL3 facilitates the injection of oxygen can result.

When the cathode portion CD3 having the structure of FIG. 10 is used, a weight reduction effect may be obtained, compared to a carbon paper formed of a carbon fiber, a manufacturing process may be simplified, and a manufacturing cost may be reduced. Also, the cathode specific capacity and the cell energy density may be improved. Also, since catalytic activity of the porous layer, that is, the NS-rGO layer, is improved, a capacity increasing effect according to the distribution of electrolyte may be expected.

In the structures of FIGS. 8 to 10, the porous layer applied to or included in the cathode catalyst layers CCL1 and CCL3 or the gas diffusion layers GDL2 and GDL3 may have the properties that are the same as or similar to the porous layer, that is, the NS-rGO layer, described with reference to FIGS. 1 to 5. Accordingly, the porous layer may include the rGO obtained by reducing the GO having a ratio (C—O/C=C) of C—O bonds to C=C bonds of about 0.5 or less. Also, the porous layer may include rGO layers having a wavy shape, and a gap, e.g., an air gap, may be formed between the rGO layers without an intermediate material. The interval between the rGO layers may be, for example, about 1 nm to about 0.15 μm, about 5 nm to about 0.1 μm, or about 10 nm to about 500 nm, and the rGO layers may form a porous structure that facilitates a cathode reaction. The porous layer may be a binder-free material layer without a binder. However, if desired, the porous layer may be a material layer including a binder. The porosity of the porous layer may be, for example, about 70 vol % to about 95 vol %, or about 75 vol % to about 99 vol %, or about 80 vol % to about 90 vol %, based on a total volume of the porous layer.

In addition, a supporting member for supporting the gas diffusion layers GDL1, GDL2, and GDL3 may be further provided. The supporting member may include the rGO, that is, the NS-rGO, according to an embodiment, and a different additional material, and the additional material may include, for example, a carbon sphere, a carbon rod, a hollow carbon sphere, a hollow carbon rod, an aerogel, a metal oxide sphere, a metal oxide rod, a hollow metal oxide sphere, and a hollow metal oxide rod, or a combination thereof.

In the structures of FIGS. 8 to 10, the gas diffusion layer GDL1 or GDL3 may not be used and at least one of the anode current collector AC1 and the cathode current collector CC1 may not be used. Without being bound by theory, since the porous layer, that is, the NS-rGO layer, according to an embodiment has a relatively strong mechanical strength and a superior electric conductivity, the metal-air battery may be implemented without the cathode current collector CC1.

Figure 11:
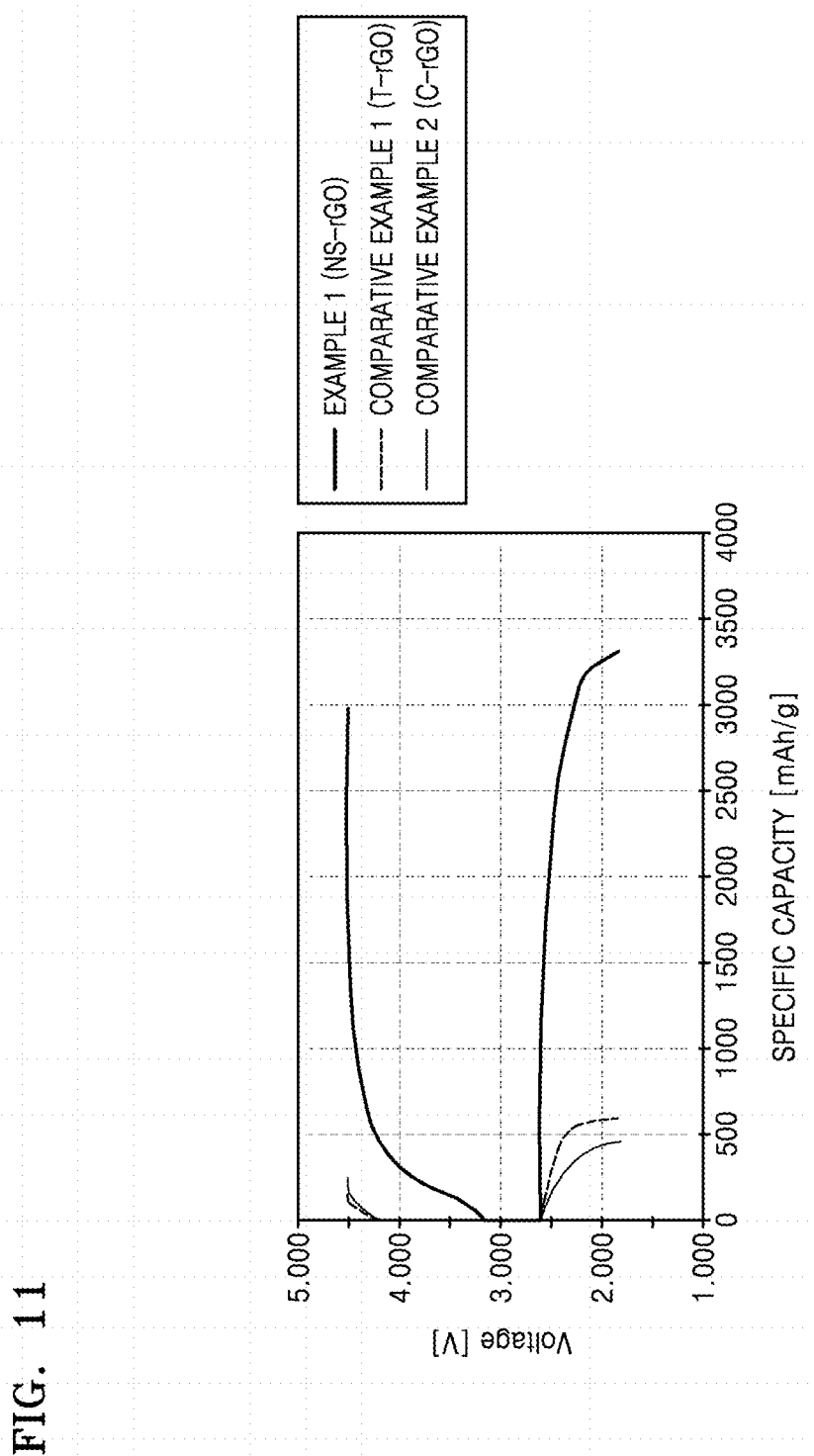
FIG. 11 is a graph of voltage (V) versus specific capacity (milliampere hours per gram (mAh/g)) and illustrates a result of measurement of charge/discharge properties of a metal-air battery including a cathode material prepared in an embodiment and comparative examples.

FIG. 11 is a graph showing a result of the measurement of the charge/discharge properties of a metal-air battery including cathode portions, according to an Example 1 and Comparative Examples 1 and 2. In FIG. 11, a metal-air battery according to Example 1 has the structure shown in FIG. 8, in which the cathode catalyst layer CCL1 includes the porous layer, that is, the NS-rGO layer, formed in the method of FIG. 1.

A metal-air battery according to Comparative Example 1, which has the structure of FIG. 8, is different from the metal-air battery according to Example 1 in that a T-rGO layer is used as the cathode catalyst layer. The T-rGO layer is a rGO layer obtained by reducing a film manufactured from GO powder through a thermal treatment process without using the anti-solvent precipitation method. The thermal treatment was performed for three hours at a temperature of about 800° C. in an atmosphere of a mixed gas of $H_2(5\%)/N_2$.

A metal-air battery according to Comparative Example 2, which has the structure of FIG. 8, is different from the metal-air battery according to Example 1 in that a C-rGO layer is used as the cathode catalyst layer. The C-rGO layer is an rGO manufactured by adding hydrazine ($N_2H_2$) as a reducing agent to an aqueous solution in which GO powder is dispersed, allowing the solution to undergo a reduction process at 90° C. for one hour, manufacturing a film through a filtration process, and allowing the film to undergo a room temperature drying process and a vacuum drying process, without using the anti-solvent precipitation method.

The charge/discharge data of FIG. 11 was obtained by measuring the open circuit voltages (OCV) of manufactured cells Example 1 and Comparative Examples 1 and 2, and then connecting the manufactured cells to a charger/discharger. After oxygen $O_2$ is supplied to the cells, a charge/discharge test was performed in a constant current (CC) mode (discharge at 0.24 mA/m$^2$) and a constant current-constant voltage (CC-CV) mode (charge at 0.24 mA/m$^2$ or 0.02 mA).

Referring to FIG. 11, the charge/discharge capacity of Example 1 is greater than the charge/discharge capacities of Comparative Example 1 and Comparative Example 2. The discharge capacities of Example 1, Comparative Example 1, and Comparative Example 2 are summarized in Table 1.

TABLE 1

|  | Example 1 (NS-rGO) | Comparative Example 1 (T-rGO) | Comparative Example 2 (C-rGO) |
| --- | --- | --- | --- |
| Discharge Capacity (mAh/g) | 3320 | 600 | 470 |

Referring to Table 1, when the NS-rGO layer of Example 1 is used, a discharge capacity of about 3300 milliampere hours per gram (mAh/g) is measured. This is a value that is more than 5 times greater than the discharge capacity of Comparative Example 1 using the T-rGO layer.

Figure 12:
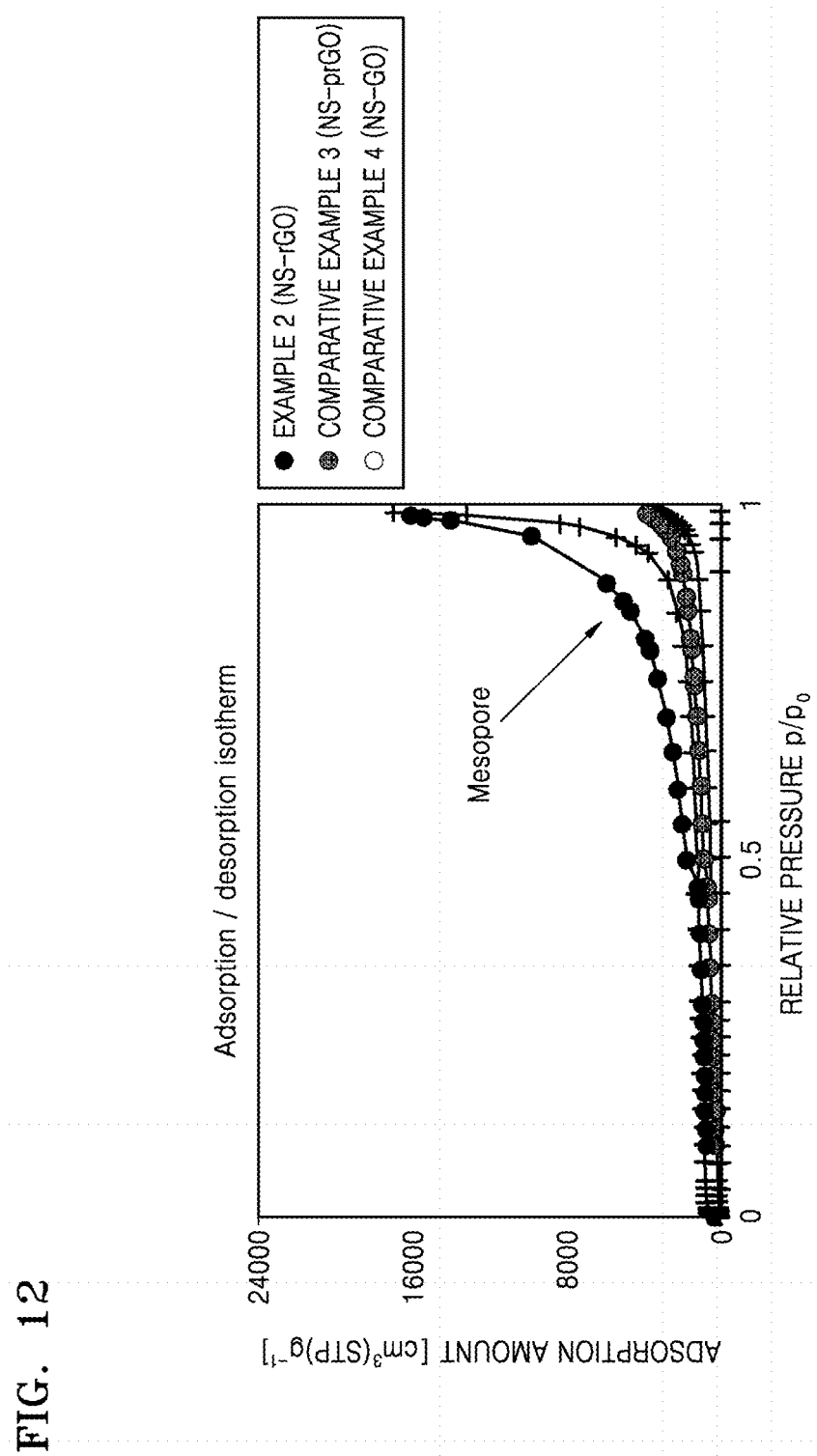
FIG. 12 is a graph of adsorption amount (cubic centimeters per gram ($cm^3g^{-1}$) at standard temperature and pressure, STP) versus relative pressure ($p/p_0$) and illustrates an absorption/desorption isotherm according to an embodiment.
Figure 13:
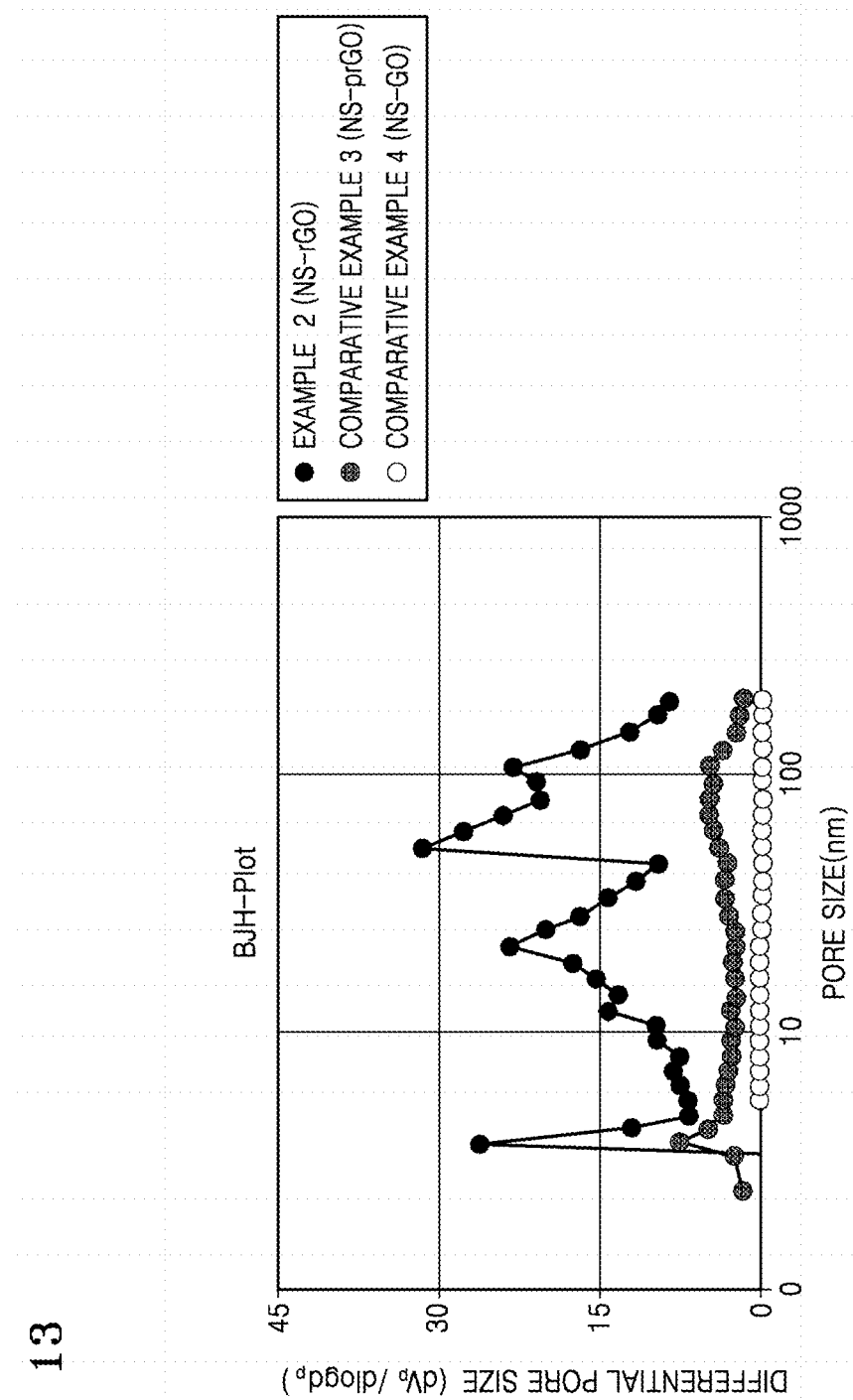
FIG. 13 is a graph of differential pore size (change of volume versus logarithmic change of pore size, $dV_p/d \log d_p$) versus pore size (nanometers) showing results of evaluation of nitrogen adsorption/desorption Barret-Joyner-Halenda (BJH) analysis performed on cathode materials prepared in an embodiment and comparative examples.

FIGS. 12 and 13 are graphs showing the results of an of nitrogen adsorption/desorption and the Barret-Joyner-Halenda (BJH) analysis on the cathode materials. FIG. 12 shows a result of an evaluation of nitrogen adsorption/desorption, whereas FIG. 13 shows a result of the BJH analysis. A cathode material according to Example 2 is the NS-rGO of FIG. 3C. A cathode material according to Comparative Example 3 is a partially reduced graphene oxide (NS-prGO) obtained by partially reducing the precipitated graphene oxide pGO of FIG. 3C. The NS-prGO is obtained by performing a first thermal treatment on the precipitated graphene oxide pGO of FIG. 3C in a hydrogen/nitrogen atmosphere at a temperature of about 300° C. A cathode material according to Comparative Example 4 is NS-GO that is not reduced and corresponds to the precipitated graphene oxide pGO of FIG. 3C.

Referring to FIG. 12, it may be seen that an adsorption/desorption graph of the NS-rGO according to Example 2 appears to be different from a graph of the cathode material (NS-prGO) according to Comparative Example 3. The material (NS-GO) according to Comparative Example 4 was not amenable to adsorption/desorption analysis. In FIG. 12, the adsorption/desorption graph corresponding to Example 2 (NS-rGO) is similar to a graph that often occurs in a material having mesopores. While not wanting to be bound by theory, the NS-rGO of Example 2 may be mesoporous.

Referring to FIG. 13, it may be seen that as a reduction rate increases, that is, in a direction of NS-GO→NS-prGO→NS-rGO, an amount of formation of mesopores increases. In particular, it may be seen that the NS-rGO according to Example 2 includes mesopores and nanopores that are smaller than the mesopores. As such, when the nanopores and the mesopores are included together at an appropriate rate, an improved specific surface area may be obtained, the transfer of oxygen may be facilitated, and a space where the reaction by-products are located may be provided.

Table 2 below is a summary of properties of samples according to Example 2, and Comparative Example 4 described in FIG. 13. The results of Table 2 are measured by a Brunauer-Emmett-Teller (BET) method.

TABLE 2

|  | Specific Surface Area ($m^2/g$) | Pore Volume ($cm^3/g$) | Average Pore Diameter (nm) |
|---|---|---|---|
| Example 2 (NS-rGO) | 3324 | 1191 | 18 |
| Comparative Example 4 (NS-GO) | 30.70 | 20.58 | 22.85 |

Referring to Table 2, it may be seen that the specific surface area and pore volume of the cathode material (NS-rGO) according to Example 2 are much greater than those of the material (NS-GO) according to Comparative Example 4. An average pore diameter of the cathode material (NS-rGO) according to Example 2 was measured to be about 18 nm. An average pore diameter of the material (NS-GO) according to Comparative Example 4 was measured to be about 22 nm. As indicated by FIG. 13, the materials did not include many pores, and thus the value of the average pore diameter of the material may have limited meaning in this case.

Figure 14A:
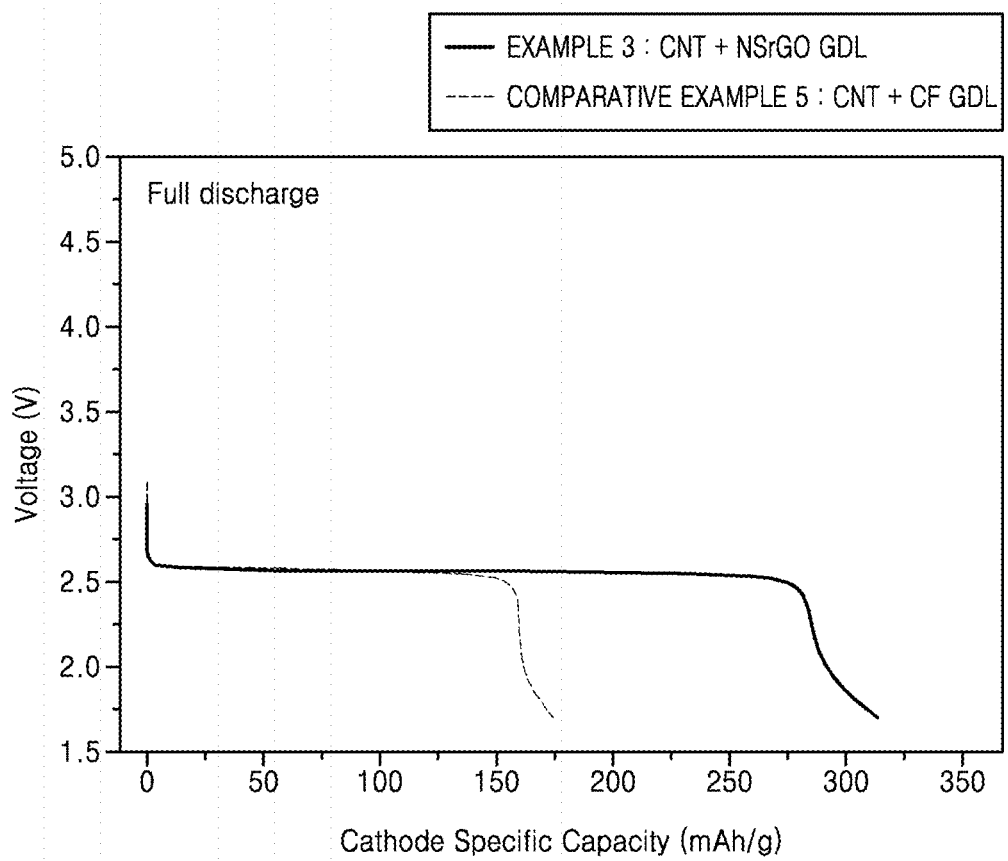
FIG. 14A is a graph of voltage (V) versus cathode specific capacity (milliampere hours per gram) and illustrates the results of measurement of cathode specific capacities of the metal-air batteries prepared in an embodiment and a comparative example.

FIG. 14A is a graph showing results of measurement of a cathode specific capacity of a metal-air battery, according to Example 3 and Comparative Example 5. While the metal-air battery according to Example 3 has the structure of FIG. 9, the cathode catalyst layer CCL2 includes CNT and the gas diffusion layer GDL2 includes the porous layer, that is, the NS-rGO layer, according to an embodiment. A metal-air battery according to Comparative Example 5, which has a structure similar to that of Example 3, is different from Example 3 in that a carbon paper formed of a carbon fiber (CF) is used as the gas diffusion layer. In other words, while the metal-air battery according to Comparative Example 5 has the structure of FIG. 9, the cathode catalyst layer includes CNT, and the gas diffusion layer includes a carbon paper formed of a carbon fiber.

Figure 14B:
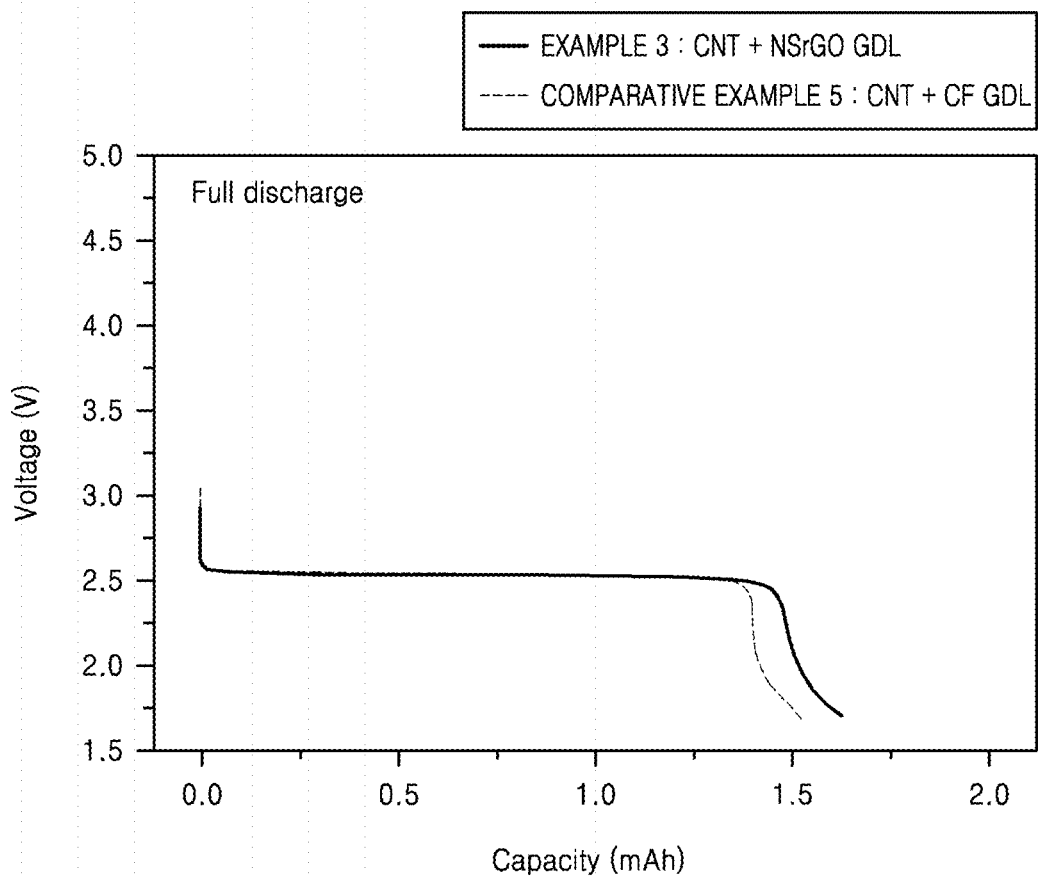
FIG. 14B is a graph of voltage (V) versus cathode capacity (milliampere hours) and illustrates the results of measurement of cathode capacity of the metal-air batteries prepared in Example 3 and a Comparative Example 5.

Referring to FIG. 14A, it may be seen that the cathode specific capacity of the metal-air battery according to Embodiment 3 is about 314 mAh/g, which is about 80% greater than the cathode specific capacity (174 mAh/g) of the metal-air battery according to Comparative Example 5. Since the cathode specific capacity signifies a capacity of a cathode to the weight thereof, the metal-air battery according to Example 3 may have a capacity to weight ratio that is greater than the capacity to weight ratio of Comparative Example 5. It may be seen from the above result that, when the porous layer, that is, the NS-rGO layer, according to an embodiment is used as the gas diffusion layer, the properties, such as, cathode specific capacity, of a metal-air battery may be improved. According to the result of FIG. 14A, the cathode specific capacity of a metal-air battery according to an embodiment may be about 250 mAh/g or greater. Referring to a capacity measurement graph shown in FIG. 14B, the capacity of the metal-air battery according to Example 3 is greater than the capacity of the metal-air battery according to Comparative Example 5. When the porous layer, that is, the NS-rGO layer, is used as the gas diffusion layer, gas diffusion properties may be improved.

Table 3 below is a summary of the materials and properties of Example 3 and Comparative Example 5 described in FIG. 14A.

TABLE 3

|  | Example 3 | Comparative Example 5 |
|---|---|---|
| Gas Diffusion Layer (GDL) | NS-rGO Porous Layer | Carbon Paper (CF) |
| Cathode Catalyst Layer | CNT (MWCNT) | CNT (MWCNT) |
| Gas Diffusion Layer Weight ($mg/cm^2$) | 0.61 | 4.3 |
| Gas Diffusion Layer Thickness ($\mu m$) | 7 | 200 |
| Capacity (mAh) | 1.62 | 1.52 |
| Cathode Specific Capacity (mAh/g) | 314 | 174 |

Referring to Table 3, while the weight and thickness of the gas diffusion layer of Example 3 are less than the weight and thickness of the diffusion layer of Comparative Example 5, the cathode specific capacity of the gas diffusion layer of Example 3 is greater than the specific capacity of the gas diffusion layer of Comparative Example 5. It may be seen from the above results that, when the porous layer, that is, the NS-rGO layer, according to an embodiment is used as the gas diffusion layer, a metal-air battery that is advantageous to weight reduction and miniaturization, and simultaneously having a high cathode specific capacity, may be implemented.

Figure 15:
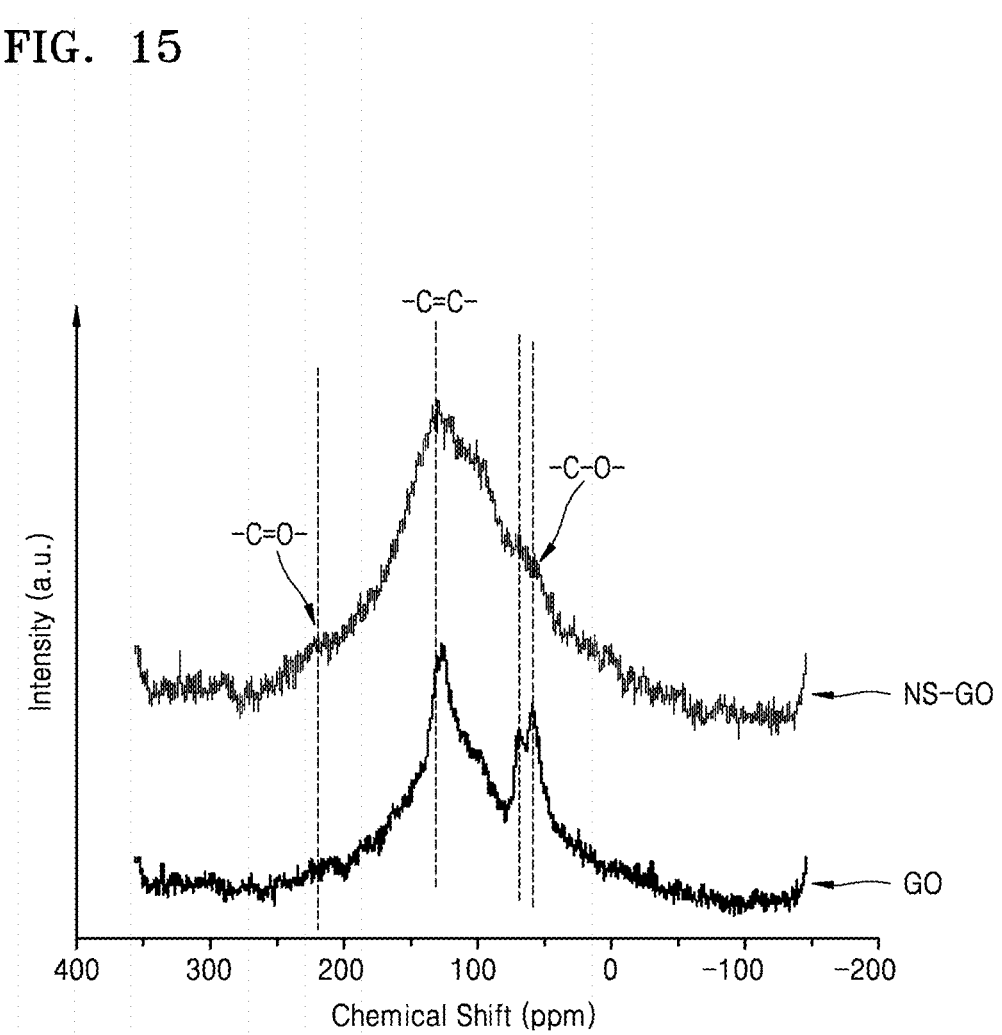
FIG. 15 is a graph of intensity (arbitrary units, a.u.) versus chemical shift (parts per million versus TMS, ppm) and illustrates the results of a solid state nuclear magnetic resonance (NMR) analysis performed on a graphene oxide (GO) and a non-stacked type graphene oxide (NS-GO)
Figure 16:
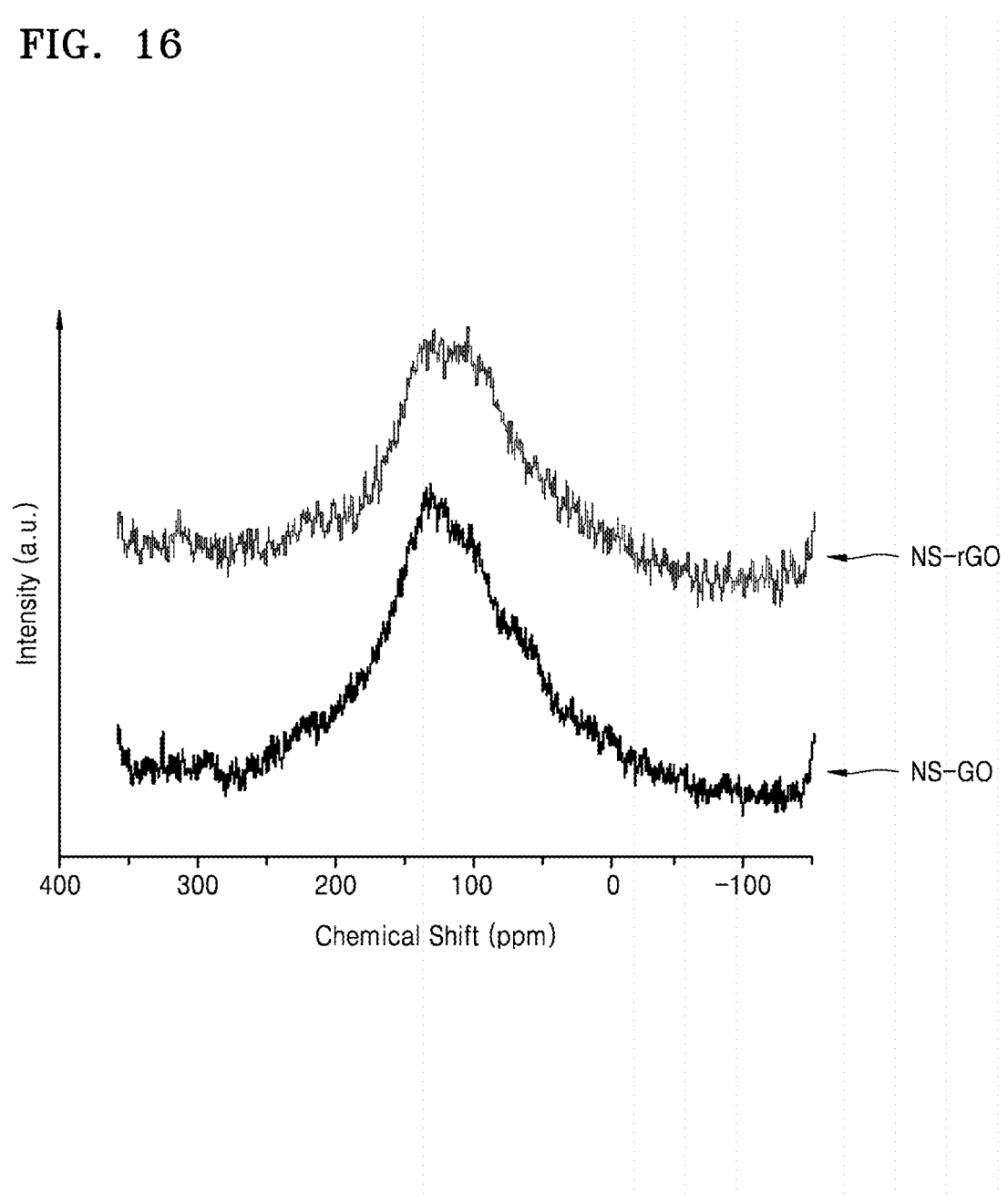
FIG. 16 is a graph of intensity (arbitrary units, a.u.) versus chemical shift (parts per million versus TMS, ppm) and illustrates the results of a solid state NMR analysis performed on a non-stacked type graphene oxide (NS-GO) and a non-stacked type reduced graphene oxide (NS-rGO)

FIG. 15 is a result of a solid state nuclear magnetic resonance (NMR) analysis on the GO and the NS-GO. FIG. 16 is a result of a solid state NMR analysis on the NS-GO and the NS-rGO. In FIG. 15, the GO is GO powder that is the starting material described in FIG. 2A. In FIGS. 15 and 16, the NS-GO corresponds to the pGO described in FIG. 3C. In FIG. 16, the NS-rGO corresponds to the rGO described in FIG. 3E. A solid state NMR spectrum in each of FIGS. 15 and 16 is a $^{13}C$ cross polarization-magic angle spinning (CP-MAS) NMR spectrum.

Referring to FIGS. 15 and 16, it may be seen that a solid state NMR analysis of the GO, the NS-GO, and the NS-rGO appear to be different from one another. In FIG. 15, a difference between the GO graph and the NS-GO graph may be a result of changing surface properties and material configuration/properties by the anti-solvent precipitation process. In FIG. 16, a difference between the NS-GO graph and the NS-rGO graph may be a result of the reduction process.

Figure 17:
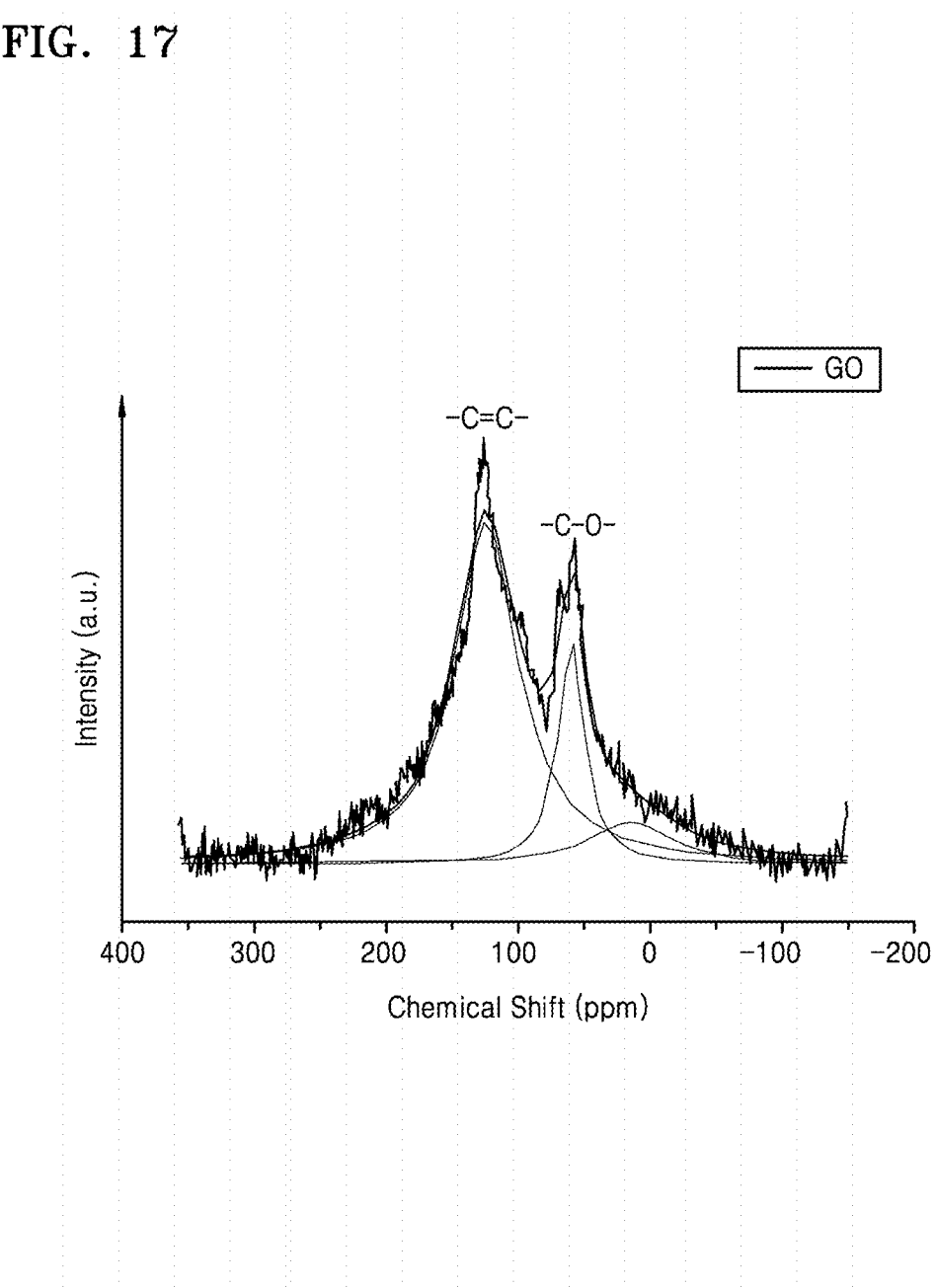
FIG. 17 is a graph of intensity (arbitrary units, a.u.) versus chemical shift (parts per million versus TMS, ppm) and illustrates the results of a solid state NMR analysis of a graphene oxide (GO) and a non-stacked type graphene oxide (NS-GO)
Figure 18:
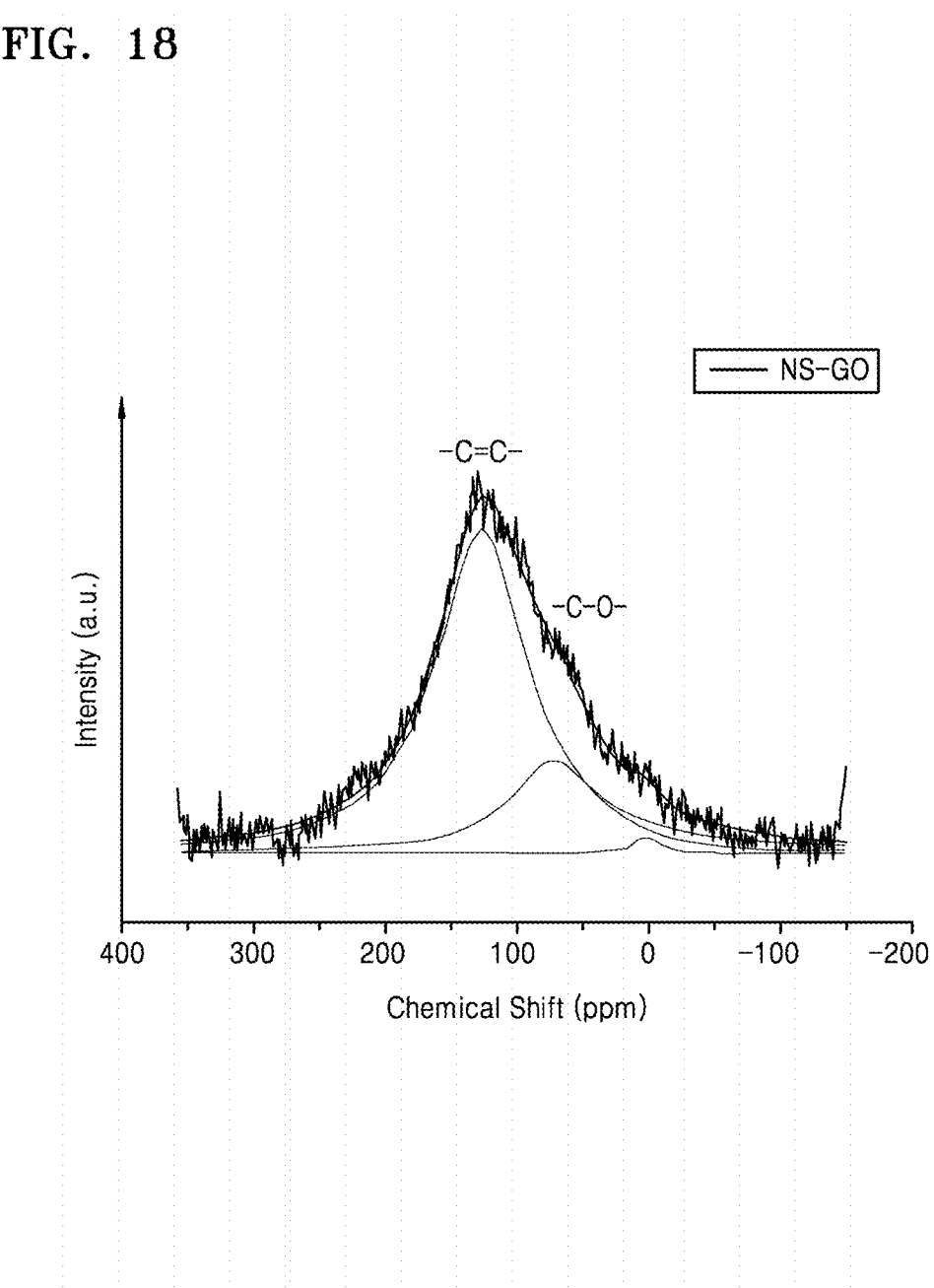
FIG. 18 is a graph of intensity (arbitrary units, a.u.) versus chemical shift (parts per million versus TMS, ppm) and illustrates the results of a solid state NMR analysis performed on a graphene oxide (GO) and a non-stacked type graphene oxide (NS-GO)

FIGS. 17 and 18 are graphs of results of a solid state NMR analysis on the GO and the NS-GO. In FIGS. 17 and 18, the positions and shapes of the separated peaks are shown.

Table 4 below is obtained from FIGS. 17 and 18 and is a summary of the areas, center positions, widths, and heights of peaks detected from the GO and the NS-GO samples. The peak areas and heights are relative values. A C═C peak content is based on peak area, and a C—O peak ratio is a ratio of the C—O peak area to the C═C peak area.

TABLE 4

|  | Area | Center | Width | Height | C=C Peak content (sp² Peak Content) | C—O Peak Ratio (sp³ Peak Ratio) |
|---|---|---|---|---|---|---|
| GO Peaks | 4275500000 | 14.3 | 75.4 | 36078000 | 71 | 0.67 |
|  | 7275200000 | 59.4 | 23.3 | 199130000 |  |  |
|  | 27828000000 | 124.0 | 59.5 | 297540000 |  |  |
| NS-GO Peaks | 736560000 | 1.7 | 21.9 | 21459000 | 77 | 0.29 |
|  | 14445000000 | 70.4 | 85.5 | 107600000 |  |  |
|  | 49947000000 | 126.6 | 84.6 | 375680000 |  |  |

As it may be seen from Table 4, while the C—O peak ratio of the GO is as large as 0.67, the C—O peak ratio of the NS-GO formed according to an embodiment is 0.29. Without being bound by theory, for the NS-GO formed by the anti-solvent method, a C—O bonding ratio is relatively low, compared to a $sp^2$ peak ratio, that is a C=C bonding ratio. As such, a ratio (C—O/C=C) of C—O bonds to C=C bonds of the NS-GO may be about 0.5 or less. The porous layer may be formed by using the NS-rGO.

FIG. 19 shows graphs of results of an X-ray photoelectron spectroscopy (XPS) analysis on the graphene oxide GO, the NS-GO, the T-rGO, and the NS-rGO. The graphene oxide GO, the NS-GO, and the NS-rGO are the same as those described in FIGS. 15 and 16, and the T-rGO is the same as the T-rGO material described in FIG. 11.

Figure 19A:
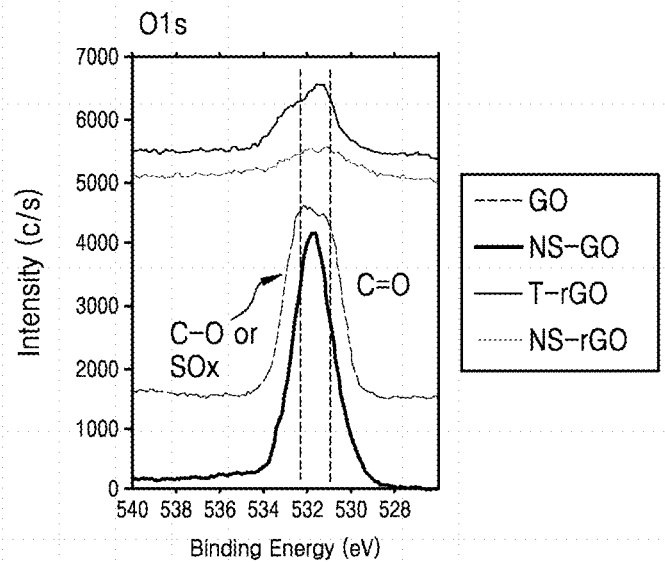
FIGS. 19A and 19B are graphs of intensity (counts per cycle, cps) versus binding energy (electron volts, eV) and illustrates the results of an X-ray photoelectron spectroscopy (XPS) analysis performed on a graphene oxide (GO), a non-stacked type graphene oxide (NS-GO), a thermally reduced stacked type graphene oxide (T-rGO), and a non-stacked type reduced graphene oxide (NS-rGO).
Figure 19B:
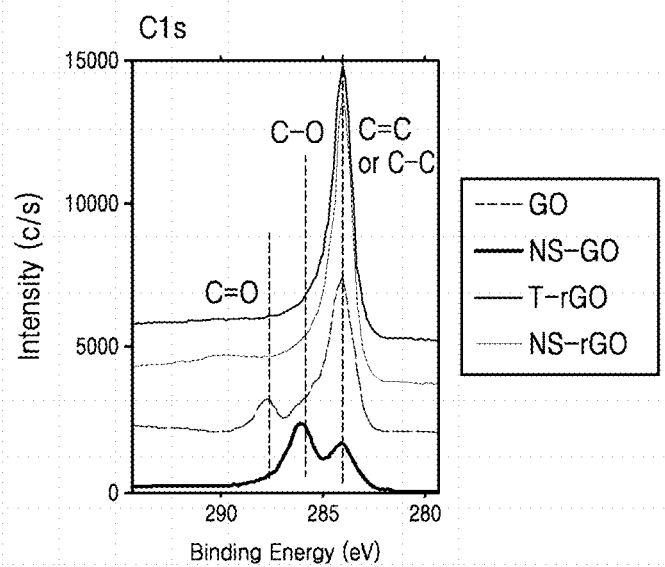

Referring to FIGS. 19A and 19B, it may be seen that the GO and the NS-GO are similar in the quantity of oxygen and in the bonding state of oxygen on a surface. While the C—O bonding takes a large portion of the NS-GO surface area, a portion of the C=O bonding appears to take an even larger portion of the surface area in the GO. For the case of NS-rGO, a carbon/oxygen (C/O) ratio appears to be greater than the carbon/oxygen (C/O) ratio of other samples.

Table 5 below is obtained from FIGS. 19A and 19B and is a summary of the material configurations of the NS-rGO and the T-rGO.

TABLE 5

|  | C1s (relative intensity) | N1s (relative intensity) | O1s (relative intensity) | Na1s (relative intensity) | Si2p (relative intensity) | S2p (relative intensity) |
|---|---|---|---|---|---|---|
| NS-rGO | 95.17 | 0.5 | 3.28 | 0.49 | 0.12 | 0.44 |
| T-rGO | 90.73 | 0 | 7 | 0.08 | 1.96 | 0.23 |

In Table 5, a C1s/O1s ratio of the NS-rGO is calculated as 95.17/3.28=29.02, and a C1s/O1s ratio of the T-rGO is calculated as 90.73/7=12.96. Accordingly, a carbon/oxygen (C/O) ratio of the NS-rGO appears to be about 2.2 times greater than a carbon/oxygen (C/O) ratio of the T-rGO.

According to an embodiment, the porous layer, that is, the NS-rGO layer, may be manufactured by a suitable method and may have superior (appropriate) physical properties as a cathode portion of a metal-air battery. Accordingly, when the porous layer, that is, the NS-rGO layer, is applied to a metal-air battery, the capacity and energy density of a metal-air battery may be increased, the charge/discharge properties may be improved, and weight reduction and miniaturization of a metal-air battery may be implemented. Also, the reduction of manufacturing costs and simplification of a process may be provided. In addition, the porous layer, that is, the NS-rGO layer, may be a binder-free material layer including no binder. In this case, the problem due to the formation of by-products or weight increase due to a binder may be fundamentally prevented.

It should be understood that embodiments described herein should be considered in a descriptive sense only and not for purposes of limitation. Descriptions of features or aspects within each embodiment should be considered as available for other similar features or aspects in other embodiments. For example, one of ordinary skill in the art would understand that the processes of FIG. 1, FIGS. 2A to 2D, FIGS. 3A to 3F, and FIGS. 4A to 4D may be changed in various ways. Also, it would be understood that the structure of a metal-air battery described with reference to FIGS. 8 to 10 may be modified in various ways. In a detailed example, although in the above-described embodiments the porous layer is described to be a binder-free material layer, a porous layer including a binder may be formed. In other words, a film similar to the porous layer may be formed by using the rGO of FIG. 3E and a mixed material comprising a binder and a solvent and the film may be applied to the metal-air battery. Also, a reaction efficiency may be improved by coating or dispersing a metal material on a surface of a cathode layer. Also, the cathode layer may include the rGO having an expanded layer interval and an additional material, for example, a metal oxide sphere, a metal oxide rod, a hollow metal oxide sphere, a hollow metal oxide rod, or a combination thereof. In addition, the porous layers may be applied to the metal-air battery and also to other secondary batteries.

While an embodiment has been described with reference to the figures, it will be understood by those of ordinary skill in the art that various changes in form and details may be made therein without departing from the spirit and scope as defined by the following claims.

What is claimed is:

1. A metal-air battery comprising:
   an anode portion comprising a metal;
   a cathode portion comprising a porous layer, wherein the porous layer comprises a reduced non-stacked graphene oxide; and
   an electrolyte disposed between the anode portion and the cathode portion,
   wherein adjacent layers of the reduced non-stacked graphene oxide of the porous layer which are separated by an interval of about 1 nanometer to about 0.15 micrometer,
   wherein the porous layer has a porosity of 70 volume percent to 99 volume percent, and
   wherein the reduced non-stacked graphene oxide has mesopores and nanopores that are smaller than the mesopores.

2. The metal-air battery of claim 1, wherein the porous layer consists of the reduced non-stacked graphene oxide.

3. The metal-air battery of claim 1, wherein the reduced non-stacked graphene oxide is derived from a non-stacked graphene oxide having a ratio of C—O bonds to C=C bonds of about 0.5 or less.

4. The metal-air battery of claim 3, wherein the ratio of C—O bonds to C=C bonds of the reduced non-stacked graphene oxide ranges from about 0.1 to about 0.5, and
wherein the reduced non-stacked graphene oxide has a porous structure.

5. The metal-air battery of claim 1,
wherein the porous layer comprises a plurality of the reduced non-stacked graphene oxide layers, and
wherein the porous layer has a wave shape.

6. The metal-air battery of claim 5, wherein the plurality of reduced non-stacked graphene oxide layers form a porous structure.

7. The metal-air battery of claim 1, wherein the porous layer comprises a binder-free material layer.

8. The metal-air battery of claim 1, wherein the porous layer comprises a binder.

9. The metal-air battery of claim 1, wherein a porosity of the porous layer ranges from about 70 volume percent to about 95 volume percent, based on a total volume of the porous layer.

10. The metal-air battery of claim 1, wherein the cathode portion comprises
a cathode layer, and
a gas diffusion layer on at least one surface of the cathode layer,
wherein at least one of the cathode layer and the gas diffusion layer includes the porous layer.

11. The metal-air battery of claim 10, wherein a supporting member supporting the gas diffusion layer comprises the reduced graphene oxide and an additional material, and wherein the additional material comprises a carbon sphere, a carbon rod, a hollow carbon sphere, a hollow carbon rod, an aerogel, a metal oxide sphere, a metal oxide rod, a hollow metal oxide sphere, a hollow metal oxide rod, or a combination thereof.

12. The metal-air battery of claim 10, wherein a thickness of the cathode layer ranges from about 1 micrometer to about 100 micrometers.

13. The metal-air battery of claim 10, wherein a thickness of the gas diffusion layer ranges from about 1 micrometer to about 30 micrometers.

14. The metal-air battery of claim 1, wherein the metal-air battery has a cathode specific capacity of about 250 milliampere hours per gram or greater.

15. The metal-air battery of claim 1,
wherein a specific surface area of the porous layer ranges from about 1000 square meters per gram or more; and
wherein a weight ratio of the reduced non-stacked graphene oxide is about 85 weight percent to 100 weight percent, based on a total weight of the porous layer.

16. A method of manufacturing a metal-air battery, the method comprising:
providing an anode portion comprising a metal;
forming a cathode portion configured for using oxygen as an active material, wherein the cathode portion comprises a porous layer; and
providing an electrolyte between the anode portion and the cathode portion,
wherein the forming of the cathode portion comprises
forming a non-stacked graphene oxide using an anti-solvent precipitation method,
reducing the non-stacked graphene oxide to form a reduced non-stacked graphene oxide, and
disposing the reduced non-stacked graphene oxide to form the porous layer to manufacture the metal-air battery,
wherein the reduced non-stacked graphene oxide has a crumpled shape and comprises adjacent layers which are separated by an interval of about 1 nanometer to about 0.15 micrometer, and
wherein the porous layer has a porosity of 70 volume percent to 99 volume percent.

17. The method of claim 16, wherein the forming of the non-stacked graphene oxide using an anti-solvent precipitation method comprises:
dissolving the graphene oxide in a polar solvent to form a solution;
adding a non-polar solvent to the solution to precipitate the non-stacked graphene oxide; and
drying the precipitated non-stacked graphene oxide.

18. The method of claim 16, wherein the reducing of the non-stacked graphene oxide comprises heating the non-stacked graphene oxide in a mixed gas atmosphere of hydrogen and nitrogen to form the reduced non-stacked graphene oxide.

19. The method of claim 18, wherein the heating of the non-stacked graphene oxide comprises:
performing a first thermal treatment on the non-stacked graphene oxide at a temperature in a range of about 150° C. to about 500° C.; and then
performing a second thermal treatment on the non-stacked graphene oxide at a temperature in a range of about 700° C. to about 1200° C.

20. The method of claim 16, wherein the reducing of the non-stacked graphene oxide comprises contacting the non-stacked graphene oxide and a reducing agent.

21. The method of claim 16, wherein the forming of the porous layer comprises:
dispersing the reduced non-stacked graphene oxide in a solvent to form a dispersion; and
vacuum filtering the dispersion to form a free-standing film comprising the reduced non-stacked graphene oxide.

22. The method of claim 21, wherein the dispersing of the reduced non-stacked graphene oxide in the solvent comprises at least one of:
adding a dispersing agent to the solvent to disperse the reduced non-stacked graphene oxide; and
sonicating a combination of the solvent and the reduced non-stacked graphene oxide.

23. The method of claim 16, wherein the porous layer comprises a binder-free material layer.

24. The method of claim 16, wherein the porous layer consists of the reduced non-stacked graphene oxide.

25. The method of claim 16, wherein the porous layer comprises a binder.

26. The method of claim 16, wherein a ratio of C—O bonds to C=C bonds of the non-stacked graphene oxide is about 0.5 or less.

27. The method of claim 16, wherein the porous layer comprises a plurality of reduced non-stacked graphene oxide layers,
wherein the porous layer has a wave shape.

28. The method of claim 16, wherein the cathode portion comprises
a cathode layer, and
a gas diffusion layer contacting the cathode layer, wherein at least one of the cathode layer and the gas diffusion layer comprises the porous layer.

* * * * *